(12) United States Patent
Becker et al.

(10) Patent No.: US 8,401,038 B2
(45) Date of Patent: Mar. 19, 2013

(54) FALSE LOCK DETECTION FOR PHYSICAL LAYER FRAME SYNCHRONIZATION

(75) Inventors: Donald W. Becker, Rancho Sante Fe, CA (US); Matthew D. Nimon, Hinckley, OH (US); William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 555 days.

(21) Appl. No.: 12/486,587

(22) Filed: Jun. 17, 2009

(65) Prior Publication Data

US 2010/0150054 A1    Jun. 17, 2010

Related U.S. Application Data

(60) Provisional application No. 61/138,369, filed on Dec. 17, 2008.

(51) Int. Cl.
| H04J 3/00 | (2006.01) |
| H04J 3/02 | (2006.01) |
| H04B 7/00 | (2006.01) |
| H04B 1/00 | (2006.01) |
| H04B 1/66 | (2006.01) |
| H04L 27/22 | (2006.01) |
| G06F 7/38 | (2006.01) |
| B41J 29/393 | (2006.01) |
| G11C 29/00 | (2006.01) |

(52) U.S. Cl. ........ 370/476; 370/310; 370/542; 375/148; 375/240; 375/330; 708/446; 347/19; 714/765

(58) Field of Classification Search .................. 370/512, 370/476, 208, 349, 315, 316, 542, 241, 242, 370/244, 245, 248; 375/240.02, 330, 329, 375/148, 150; 714/765
See application file for complete search history.

(56) References Cited

U.S. PATENT DOCUMENTS

| 6,885,716 | B1 | 4/2005 | Zalud et al. | |
| 7,639,733 | B1 | 12/2009 | Lee et al. | |
| 7,715,786 | B2 | 5/2010 | Santoru et al. | |
| 8,023,888 | B2 | 9/2011 | Santoru et al. | |
| 2002/0163551 | A1* | 11/2002 | Bruch et al. | ................. 347/19 |
| 2003/0235240 | A1* | 12/2003 | Kawamoto et al. | ........... 375/148 |
| 2004/0252725 | A1 | 12/2004 | Sun et al. | |
| 2006/0093078 | A1 | 5/2006 | Lewis et al. | |
| 2006/0115025 | A1 | 6/2006 | Kim et al. | |
| 2007/0206638 | A1* | 9/2007 | Santoru et al. | ................ 370/476 |
| 2007/0233765 | A1* | 10/2007 | Gupta et al. | ................. 708/446 |
| 2008/0025389 | A1* | 1/2008 | Markman et al. | ........ 375/240.02 |
| 2008/0168330 | A1* | 7/2008 | Graef et al. | ................... 714/765 |
| 2008/0170645 | A1 | 7/2008 | Kleider et al. | |
| 2008/0285591 | A1 | 11/2008 | Kim et al. | |
| 2009/0022085 | A1 | 1/2009 | Dankberg et al. | |

(Continued)

FOREIGN PATENT DOCUMENTS

KR    10-2006-0031894 A    4/2006

OTHER PUBLICATIONS

PCT/US2009/068387, International Search Report, dated Jul. 15, 2010, 3 pages.

(Continued)

*Primary Examiner* — Ian N Moore
*Assistant Examiner* — Kiet Tang
(74) *Attorney, Agent, or Firm* — Kilpatrick Townsend and Stockton

(57) ABSTRACT

Systems, devices, processors, and methods are described which may be used for the reception of a wireless broadband signal at a user terminal from a gateway via a satellite. A wireless signal may include a series of physical layer frames, each frame including a physical layer header and payload. The received signal is digitized and processed using various novel physical layer headers and related techniques to synchronize the physical layer frames and recover data from physical layer headers for purposes of demodulation and decoding.

18 Claims, 22 Drawing Sheets

U.S. PATENT DOCUMENTS

| | | | |
|---|---|---|---|
| 2009/0168813 A1* | 7/2009 | Crookes et al. | 370/542 |
| 2009/0285151 A1 | 11/2009 | Eidenschink et al. | |
| 2009/0285152 A1 | 11/2009 | Eidenschink et al. | |
| 2009/0323865 A1* | 12/2009 | Bradley et al. | 375/330 |
| 2010/0007743 A1 | 1/2010 | Kim et al. | |
| 2010/0046415 A1 | 2/2010 | Kim et al. | |
| 2010/0135335 A1 | 6/2010 | Matsumoto et al. | |
| 2010/0150037 A1 | 6/2010 | Becker et al. | |
| 2010/0150053 A1 | 6/2010 | Becker et al. | |

OTHER PUBLICATIONS

Non-Final Office Action for U.S. Appl. No. 12/486,548 mailed on Jun. 29, 2012, 15 pages.

Non-Final Office Action for U.S. Appl. No. 12/486,556 mailed on Oct. 20, 2011, 10 pages.

International Search Report and Written Opinion for PCT Patent Application No. PCT/US2009/068387, mailed on Jul. 15, 2010, 11 pages.

Notice of Allowance for U.S. Appl. No. 12/486,556 mailed on Feb. 3, 2012; 8 pages.

Non-Final Office Action for U.S. Appl. No. 12/486,548 mailed on Mar. 15, 2012, 15 pages.

Notice of Allowance for U.S. Appl. No. 12/486,548 mailed on Aug. 30, 2012, 14 pages.

* cited by examiner

FALSE LOCK DETECTION FOR PHYSICAL LAYER FRAME SYNCHRONIZATION

CROSS-REFERENCES TO RELATED APPLICATIONS

This application claims priority from U.S. Provisional Patent Application No. 61/138,369, filed Dec. 17, 2008, entitled "PHYSICAL LAYER HEADER SYNCHRONIZATION AND PROCESSING", which is hereby incorporated by reference, as if set forth in full in this document, for all purposes.

This application is related to the following commonly assigned patent applications: U.S. patent application Ser. No. 12/486,548, filed Jun. 17, 2009, entitled "START OF FRAME CORRELATION FOR PHYSICAL LAYER HEADER SYNCHRONIZATION"; and U.S. patent application Ser. No. 12/486,556, filed Jun. 17, 2009, entitled "NOVEL PHYSICAL LAYER HEADER STRUCTURE FOR DECODING AND SYNCHRONIZATION".

BACKGROUND

The present invention relates to wireless communications in general and, in particular, to a satellite communications network.

Broadband satellite services are gaining traction in North America. While such first generation satellite systems may provide multi-gigabit per second (Gbps) per satellite overall capacity, many current designs of such systems may inherently limit the number of customers who may be served with sufficient bandwidth. For example, because this capacity may be split across numerous coverage areas, the bandwidth to each user may be constrained. While existing designs have a number of capacity limitations, the demand for such broadband services continues to grow.

To meet such demands, multi-beams satellites may be used with Variable Coding and Modulation (VCM) or Adaptive Coding and Modulation (ACM). According to the message type and the link condition, VCM and ACM transmitters utilize codes of various rates and sizes and modulations of different orders. High rate codes and high order modulations are used to take advantage of favorable channel conditions, while low rate codes and low order modulations are used to ensure error free transmission when the channel conditions degrade.

Physical layer frame synchronization and physical layer header processing present difficult challenges in such an environment. In some instances, an identifier known at the receiver is included in a physical layer header to assist in identifying a start of a frame, and provide for frame synchronization. However, this solution may increase overhead because an identifier known at the receiver does not carry information. Physical layer header decoding can also present challenges. Modulation and coding can change on a per-frame basis, and information on the applicable format may be included in the physical layer header. Reliable and efficient physical layer header synchronization and decoding techniques may, therefore, be beneficial in a range of VCM and ACM systems.

BRIEF SUMMARY

Systems, devices, processors, and methods are described which may be used for the reception of a wireless broadband signal via satellite. In one set of embodiments, a wireless signal is generated and transmitted from the gateway to the satellite, the signal including a series of physical layer frames. Each frame includes a physical layer header and payload. The wireless signal may be received at a terminal via the satellite.

The received signal is processed to produce a digitized stream representative of the wireless signal. The digitized stream is processed to detect the physical layer header for a physical layer frame in the digitized stream. The header portion is demodulated and decoded to identify signaling information. Based on the signaling information, the payload associated with the header may be forwarded for demodulation and decoding based on the modulation and coding format specified in the signaling information, or may be filtered.

In one set of embodiments, synchronization of the physical layer frames is described. A start of frame correlator is built around a correlation function that correlates a first portion of a code block with a second portion of a code block (e.g., correlating the first 16 symbols of a Walsh code block with the second 16 symbols of the code block). A correlation value may be calculated over a number of code blocks (e.g., over the most recent 32 symbols and added to correlations calculated 32 and 64 symbol times prior to get a full calculation over the three Walsh codes in a physical layer header). The symbol position with the largest total correlation value over a period may be chosen as the start of frame hypothesis.

For another set of embodiments, a novel format for a physical layer header is described. One or more code blocks of a physical layer header serve multiple functions, as they may be formatted for use in frame synchronization and also include signaling information. These may be the Walsh code blocks described above. By way of example, the code blocks may be processed to identify a start of frame location, and may also be decoded (e.g., via a fast hadamard transform (FHT) function) to identify a sub-channel identifier and a modulation and coding format attributable to the payload of the frame.

In another set of embodiments, once a location of a physical layer header is identified and the frames are synchronized, the data in a physical layer header may be decoded. The decoding process may also be used to ensure that synchronization is valid. By way of example, each of the code blocks in a physical layer header may get decoded (e.g., via a fast hadamard transform (FHT) function), and the results may be stored. Some code blocks may include signaling information, while others may include parity information. A max correlation search may identify the most likely transmitted coded word set and output statistics from the winning FHT bins. A second decoding process is used to confirm that synchronization is realized, or if there is a false synchronization lock.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, devices, and methods are described which may be used for the transmission of a wireless broadband signal from a gateway via satellite to a user terminal. A wireless signal may include a series of physical layer frames, each frame including a physical layer header and payload. The received signal is digitized and processed using various novel techniques to synchronize the physical layer frames and reliably and efficiently recover data from physical layer headers for purposes of demodulation and decoding.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following may individually or collectively be components of a larger system, wherein other procedures may take precedence over or otherwise modify their application. Also, a number of steps may be required before, after, or concurrently with the following embodiments.

Systems, devices, processors, and methods are described for physical layer frame synchronization and header processing of a received satellite communication signal. In one set of embodiments, a wireless signal is generated and transmitted including a series of physical layer frames, each frame including a physical layer header and payload. The received signal is processed to synchronize the physical layer frames, and process physical layer headers.

The code blocks of a physical layer header may serve multiple functions. In some embodiments, different portions of a received signal are correlated to identify code blocks corresponding to a start of frame location. The code blocks, in addition to enabling frame synchronization, are also formatted to provide signaling information. Thus, they may also be decoded (e.g., via a fast hadamard transform (FHT) function) to identify sub-channel identifier and modulation and coding information attributable to the payload of the frame. A novel false lock detection scheme is described, as well.

Figure 1:
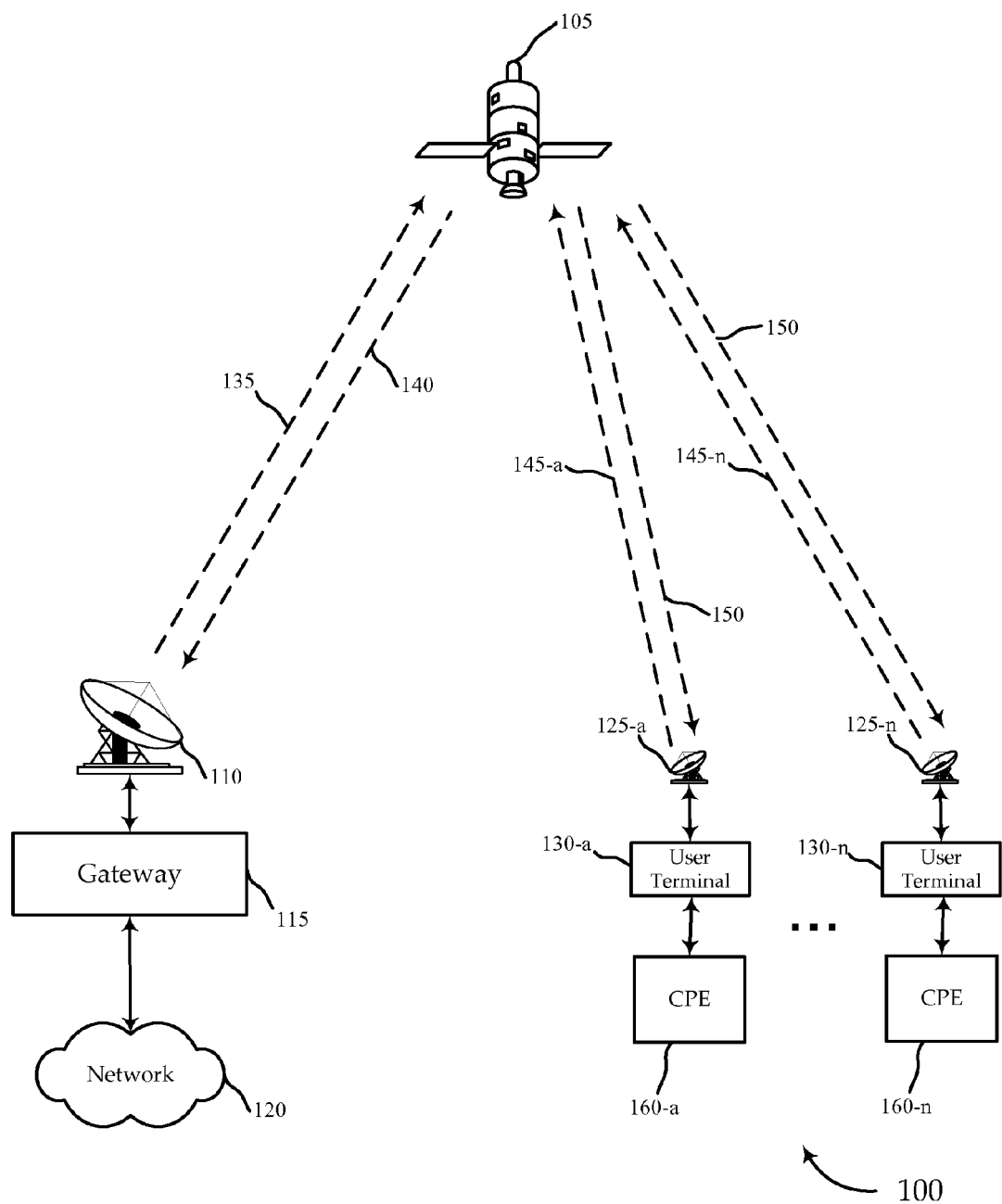
FIG. 1 is a block diagram of a satellite communications system configured according to various embodiments of the invention.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well (e.g., other peer-to-peer wired or wireless links). The satellite communications system 100 includes a network 120, such as the Internet, interfaced with a gateway 115 that is configured to communicate with one or more user terminals 130, via a satellite 105. The physical layer frame synchronization and header processing techniques discussed herein may be used by a user terminal 130 to process signals received from a gateway 115 via satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network may connect the gateway 115 with other gateways (not pictured), which are also in communication with the satellite 105, and which may share information on link conditions and other network metrics.

The gateway 115 provides an interface between the network 120 and the user terminal 130. The gateway 115 may be configured to receive data and information directed to one or more user terminals 130, and format the data and information (e.g., using CCM, ACM, or VCM) for delivery downstream to the respective user terminals 130 via the satellite 105. Similarly, the gateway 115 may be configured to receive upstream signals from the satellite 105 (e.g., from one or more user terminals 130) directed to a destination in the network 120, and can format the received signals for transmission through the network 120.

A device (not shown) connected to the network 120 may, therefore, communicate with one or more user terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the DVB-S2 and WiMAX standards. In a number of embodiments, the gateway 115 utilizes ACM in conjunction with one or more of the traffic control and shaping techniques described herein to direct traffic to the individual terminals. The gateway 115 may use a broadcast signal, with a modulation and coding format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more user terminals 130. In one embodiment, the satellite 105 operates in a multi-beam mode, transmitting a number of narrow beams each directed at a different region of the earth, allowing for frequency re-use. With such a multi-beam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more user terminals 130, via the respective user antenna 125. In one embodiment, the antenna 125 and terminal 130 together make up a very small aperture terminal (VSAT). In other embodiments, a variety of other types of antennas 125 may be used at the user terminal 130 to receive the signal from the satellite 105. Each of the user terminals 130 may be a single user terminal or, alternatively, be a hub or router (not pictured) that is coupled with multiple user terminals. Each user terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the user terminals 130. In this embodiment, a number of frequency channels are allocated which may be fixed, or which may be allocated in a more dynamic fashion. A Time-Division Multiple-Access (TDMA) scheme is then employed in each frequency channel. In this scheme, each frequency channel may be divided into several timeslots that can be assigned to a connection (i.e., a user terminal 130). In other embodiments, one or more of the upstream links 140, 145 may be configured with other schemes, such as TDMA, FDMA, OFDMA, CDMA, or any number of hybrid or other schemes known in the art.

A user terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The user terminal 130 itself may measure or estimate the signal quality, or it may pass information measured or estimated by other devices. A user terminal 130 may also transmit data and information to a network 120 destination via the satellite 105 and gateway 115. The user terminal 130 transmits the signals via the upstream uplink 145 to the satellite 105 using the antenna 125. A user terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement ACM, adjusting the modulation and coding formats to each terminal or set of terminals based on their link conditions.

Figure 2A:
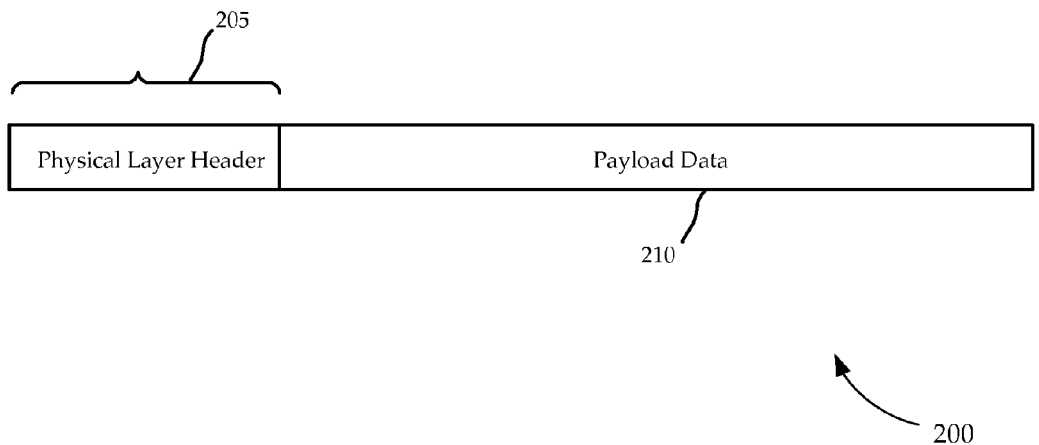
FIGS. 2A and 2B are block diagrams illustrating example physical layer frame formats according to various embodiments of the invention.

When a gateway 115 has selected the applicable modulation and coding, it may encapsulate data received from the network to be transmitted via the satellite 105 to a user terminal 130. FIG. 2A is a block diagram illustrating an example physical layer frame format 200 that may be used. A physical layer header 205 may be made up of encoded data including a sub-channel identifier and modulation and coding data. The payload data 210 may be the payload for the physical layer frame 200, and may be one or more IP packets, encapsulated in a MAC frame which is FEC encoded and modulated (e.g., it may be, or be equivalent to, a FEC or XFEC frame under the DVB-S2 standard).

The modulation and coding data in the physical layer header 205 may identify the modulation and coding (e.g., the particular codeword sizes, code rates, modulation schemes and pilot insertions) for encoded and modulated payload data 210 that is appended to the physical layer header 205. The physical layer header 205 (or parts thereof) may be protected by very low code rates so that it may be reliably received during excellent, or poor, SNR conditions. The encoded and modulated payload data 210, however, is in many embodiments adaptively coded on a per-terminal (or per-set of terminals) basis. By way of example, a user terminal 130 receiving a transmitted signal in a very low SNR environment may receive a frame 200 in which the encoded and modulated payload data 210 has been encoded at a very low code rate and at a very low order modulation. Conversely, a terminal 130 receiving a transmitted signal at a very high SNR may receive a physical layer frame 200 in which the encoded and modulated payload data 210 has been encoded at a very high code rate and at a very high order modulation.

In addition, physical layer header 205 may include a sub-channel identifier configured to identify different frames as belonging to particular sub-channels. By utilizing sub-channel identifiers in a physical layer header 205, receiving devices (e.g., the user terminals 130) may filter packets based on the sub-channel identifier without demodulating or decoding the payload 210. Thus, the information to be demodulated and decoded (e.g., payload 210 directed to other sub-channels and other user terminals 130) may be limited or otherwise filtered thereby. A given sub-channel may, therefore, be a fraction (e.g., ¼, ⅛, 1/16) of the downstream channel. A user terminal 130 may be configured to filter a physical layer frame 200, demodulating and decoding a payload 210 only if the sub-channel identifier in the physical layer header 205 matches one or more sub-channels for the terminal.

Figure 2B:
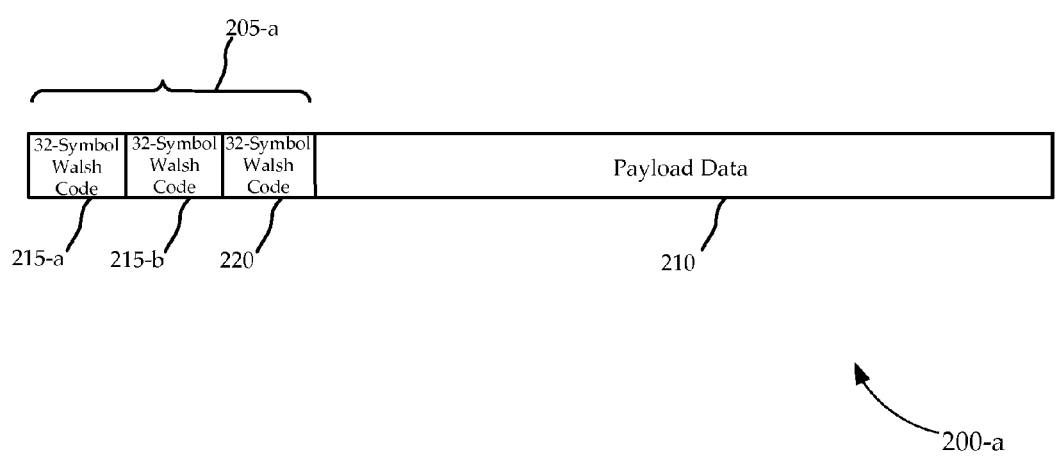

FIG. 2B illustrates an example embodiment of physical layer frame 200-a which may be the physical layer frame of FIG. 2A. In the example, the physical layer header 205-a is a 96-symbol physical layer header at the start of each physical layer frame. The physical layer header 205-a includes three 32-symbol signaling words ((32,5) Walsh codes). In one embodiment, the first two Walsh code blocks 215 each include five bits of information, while the third Walsh code block 220 includes parity (or other redundancy) information. In some embodiments, the first 16 bits of each code block have certain symmetric relationships with the second 16 bits of the respective code block. Such symmetrical, or asymmetrical, properties with the structure of a code may be used to identify the starting point of the frame or a future frame, and/or the location of the header. Other codes may be used in other embodiments (e.g., different codes, of different lengths), and the symmetrical or asymmetrical properties with the structure of the code may be used to identify the start and synchronize the incoming frames.

Figure 3:
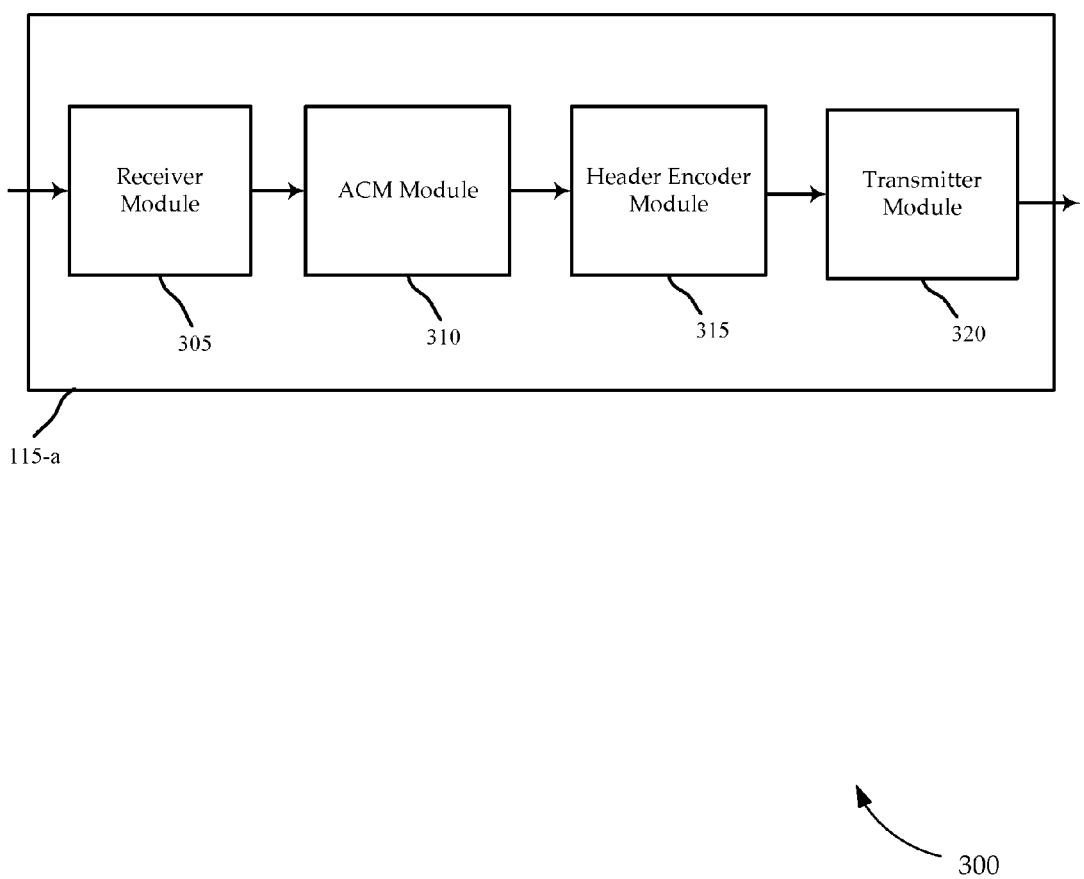
FIG. 3 is a block diagram of a gateway for a satellite communications system configured according to various embodiments of the invention.

Referring next to FIG. 3, an embodiment of a gateway 115-a (e.g., the gateway 115 of FIG. 1) is shown in block diagram form 300. In this embodiment, the gateway 115-a includes a receiver module 305, an ACM module 310, a header encoder module 315, and a transmitter module 320, each in communication with each other directly or indirectly. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors. Each module may include memory, or accessed memory may be elsewhere on or off the terminal 130.

The receiver module 305 may receive a set of data to be transmitted via a satellite destined for a user terminal. This set of data may be received from a device in network 120 of FIG. 1, to be transmitted via satellite 105 to user terminal 130. The ACM module may be configured to dynamically assign a modulation and coding format for the set of data based on the link conditions for the destination user terminal. The particular modulation and coding format may be determined by the user terminal 130, the gateway 115-a, or elsewhere.

The header encoder module 315 may generate a code block making up all or part of a physical layer header (e.g., the physical layer header 205 of FIG. 2A or 2B). The header encoder module may generate a number of adjacent sub-blocks making up the code block. All or part of the code block may include signaling information, identifying a sub-channel identifier and an assigned modulation and coding format. The code block may include one or more sub-blocks made up of symmetrical elements formatted to be useable by a receiving user terminal to identify the start of frame. Thus, the physical layer header may correspond to the start of frame location. The sub-blocks may each be a Walsh code block (e.g., Walsh code block 215, 220 of FIG. 2B), wherein a first half of each respective Walsh code block is substantially symmetrical to a second half of each respective Walsh code block. In some embodiments, some sub-blocks include signaling information and the third sub-block includes parity information. The transmitter module 320 may transmit the physical layer header and the set of data appended thereto, the set of data transmitted according to the assigned modulation and coding format.

Figure 4:
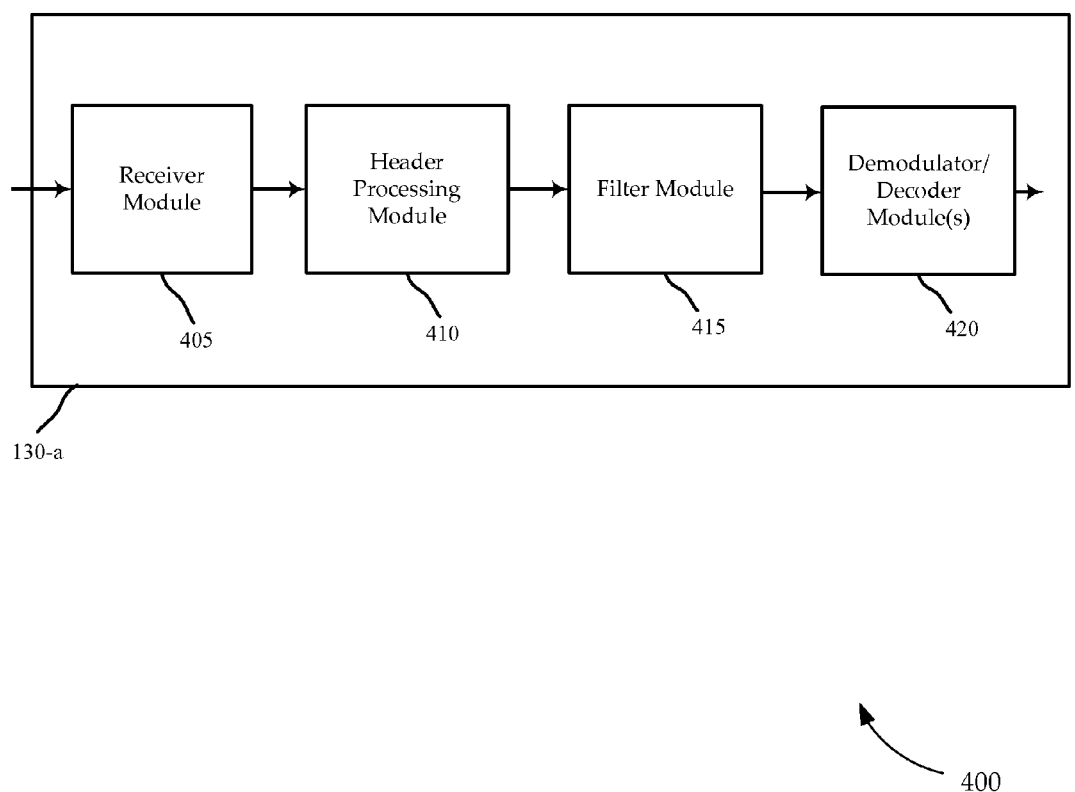
FIG. 4 is a block diagram of a user terminal for a satellite communications system configured according to various embodiments of the invention.

Referring next to FIG. 4, an embodiment of a user terminal 130-a (e.g., the user terminal 130 of FIG. 1) is shown in block diagram form 400. In this embodiment, the user terminal 130-a includes a receiver module 405, a header processing module 410, a filter module 415, and a demodulator/decoder module(s) 420, each in communication with each other directly or indirectly. These modules of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors. Each module may include memory, or accessed memory may be elsewhere on or off the terminal 130.

The receiver module 405 may be configured to receive a wireless signal transmitted via a satellite. This may, for example, be the signal transmitted from the gateway 115 through the satellite 105 as described with reference to FIG. 1, received via the user terminal antenna 130. The receiver module 405 may downconvert and digitize the signal (e.g., using an integrated or separate A/D converter, not shown). In digitizing the received signal, the receiver module 405 may continue to perform symbol timing recovery. In addition, the receiver module 405 may detect and remove quadrature errors, perform coarse frequency rotation, and provide matched filtering functions. The digitized signal may be forwarded by the receiver module 405 to the header processing module 410. The header processing module 410 may, therefore, receive a digitized physical layer signal made up of a series of symbols representative of the received wireless signal. This digitized stream may be made up of in-phase and quadrature components.

The header processing module 410 may process the digitized stream to detect a start of frame (e.g., physical layer frame 200 for FIG. 2A or 2B) location. The header processing module 410 may correlate different portions of the digitized stream to generate a number of correlation values, utilizing the correlation values to locate one or more correlation peaks and thereby identify the start of frame location. For example, the header processing module 410 may search the digitized stream to identify the codes (e.g., sub-blocks 215, 220 of FIG. 2B) in the physical layer header corresponding to the start of frame location. The header processing module 410 may then demodulate and decode a physical layer header (e.g., physical layer header 205 for FIG. 2A or 2B) to identify a sub-channel identifier for a physical layer payload (e.g., physical layer payload 210 for FIG. 2A or 2B) associated therewith. Thus, a physical layer header 205 may serve multiple functions, as it may be formatted for use in frame synchronization and also include signaling information.

The filter module(s) 415 may be configured to store one or more sub-channel identifiers (for example, sub-channel identifiers such as those in the physical layer header 205 in FIG. 2), the stored sub-channel identifiers indicating whether physical layer payload associated with the particular sub-channel identifier is to be demodulated and decoded by the user terminal 130-a. The filter module 415 may include the memory storing the information, or may access external or other on-chip memory. The filter module 415 may determine that the first sub-channel identifier matches one or more of the stored identifiers indicating that an associated physical layer payload should be dropped before further demodulation and decoding. The filter module 415 may then drop (or otherwise filter) the physical layer payload associated with the first header portion to prevent forwarding to the demodulator/decoder module(s) 420.

The header processing module 410 in some embodiments may be further configured to demodulate and decode a later, second header portion of the digitized stream to detect a second sub-channel identifier for a physical layer payload associated with the second header portion. In such embodiments, the filter module 415 is further configured to determine that the second sub-channel identifier matches one or more of the stored identifiers indicating that an associated physical layer payload is to be demodulated and decoded. The filter module 415 may forward the physical layer payload associated with the second header portion to the demodulator/decoder module(s) 420. The filter module 415 and the demodulator/decoder module(s) 420 need not be included in some embodiments.

I. Physical Layer Frame Synchronization:

In one set of embodiments, the physical layer frame synchronization is undertaken by the header processing module 410 of FIG. 4. A start of frame correlator is built around a correlation function that correlates a first portion of a code block with a second portion of a code block, using symmetrical, or asymmetrical, properties with the structure of a code to identify the starting point of the frame or a future frame, and/or identify the location of the header.

By way of example, as noted above, the header processing module 410 may receive a digitized stream of symbols, and may search for the start of frame location by calculating a number of correlation values over a period for the digitized stream. Each of the correlation values may be found by determining a correlation between different portions of the digitized stream. The correlation values may be used to locate one or more correlation peaks and thereby identify the start of frame location. There may be user configurable minimum thresholds for the peaks.

Various codes, and code lengths, may be used to identify the start of frame, and therefore be the target of the search. In one embodiment, Walsh codes (e.g., codes 215, 220 of FIG. 2B) may be used. The first 16 symbols of a Walsh code may be correlated with the second 16 symbols of the code. A correlation value may be calculated over a number of code blocks (e.g., over the most recent 32 symbols and added to correlations calculated 32 and 64 symbol times prior to get a full calculation over the three Walsh codes in a physical layer header). The symbol position with the largest total correlation value over a period may be chosen as the start of frame hypothesis.

The correlation process may be continued over subsequent periods, and correlation values for a subsequent period may be used to verify the start of frame location. If the correlation from a subsequent period does not match, the later correlation values may be used to perform other validations or comparisons.

Figure 5:
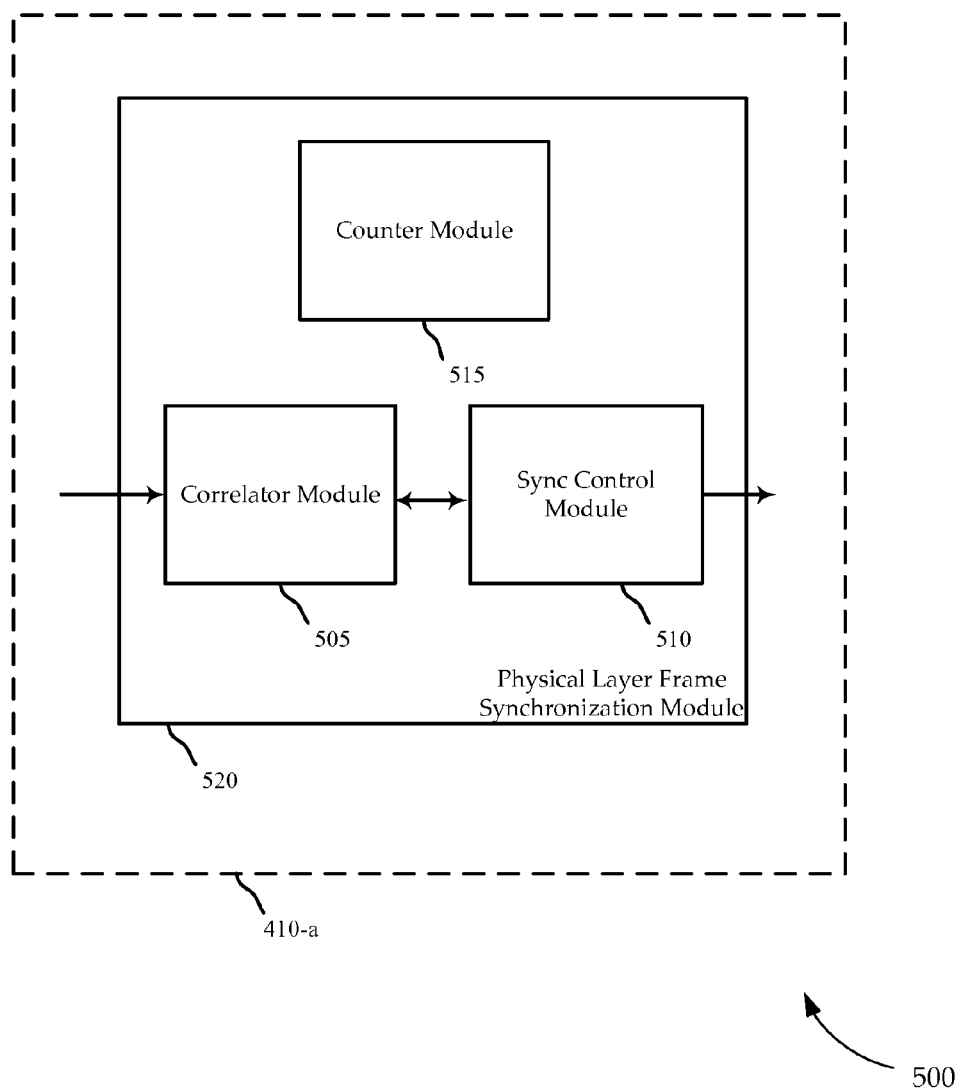
FIG. 5 is a block diagram of a physical layer frame synchronization module of a user terminal for a satellite communications system configured according to various embodiments of the invention.

Turning next to FIG. 5, a block diagram 500 is shown illustrating a physical layer frame synchronization module 520. The physical layer frame synchronization module 520 may be a part of the header processing module 410-a (e.g., the header processing module 410 of FIG. 4), or may be implemented in other devices. The physical layer frame synchronization module 520 of the illustrated embodiment includes a correlator module 505, a sync control module 510, and a counter module 515. In one set of embodiments, the physical layer frame synchronization module 520 is responsible for synchronizing the incoming physical layer frames (e.g., physical layer frame 200 of FIG. 2A or 2B), and may also monitor superframes. The correlator module 505 of the physical layer frame synchronizer module 520 may scan the incoming data symbols for a valid physical layer header correlation (e.g., the 96-symbol physical layer header of physical layer frame 205-a of FIG. 2B). This scan may be performed by calculating a number of correlation values by determining correlations between different portions of the digitized stream. The correlation values may be used to locate one or more correlation peaks and thereby identify the start of frame location. This scan may occur over the length of a frame (a frame period), although different search windows may be used in other embodiments (e.g., using multiple periods, or cutting off the search when a correlation exceeds a threshold set based on a signal quality metric).

When the pattern is detected, a frame counter in the counter module 515 may be initialized to maintain physical layer frame synchronization from frame to frame. The counter module 515 may generate a start of frame pulse with the first symbol of each physical layer frame and a superframe pulse synchronous with the first symbol of each superframe. The symbol count may be initialized to be synchronous with the start of physical layer frame (per the correlation block results), while frame and superframe counts may be initialized via system messages. The counter module 515 may provide a superframe count and physical layer frame counter as status outputs. The sync control module 510 may provide the control functionality. The counter module 515 may contain counters that update at the symbol rate.

In one set of embodiments, the physical layer frame synchronization module 520 may receive a stream of physical layer frames; the physical layer frame 200-*a* of FIG. 2B will be used for purposes of example. A digitized stream (e.g., received from the receiver module 405 of FIG. 4) is made up of equalized I/Q data, and is input to the correlator module 505 that searches for the three Walsh code blocks at the start of each physical layer frame 200-*a*. The physical layer sync control module 510 takes in the correlation results and directs the physical layer frame synchronization module 520 into physical layer frame synchronization. Scrambling and modulation from the 96-symbol physical layer header data may be removed by other components (not shown) of the physical layer frame synchronization module 520.

In some embodiments, the correlation function is built around a 32-symbol correlation function that correlates the first 16 symbols of a Walsh code with the second 16 symbols of the code (e.g., for Walsh code block 215-*a*, 215-*b*, or 220). For each symbol input, the correlator module 505 may calculate a correlation value over the most recent 32 symbols, and add that value to correlations calculated 32 and 64 symbol times prior to get a full calculation over the three Walsh codes in a physical layer header. The symbol position with the largest total correlation value over a search period may be chosen as the start of frame hypothesis.

In one embodiment, the correlator module 505 performs a 32-symbol correlation over a single Walsh code $\{w_0, w_1, \ldots, w_{31}\}$ where all elements are complex $w_k = w\_i_k + j \ast w\_q_k$. Each Walsh code is scrambled via a 32-bit scrambling sequence (the following scrambling sequence is only for purposes of examples, as other scrambling sequences may be used):
$\{s0, s1, \ldots, s31\} = \{-1,1,1,1,-1,-1,-1,1,1,-1,-1,1,1,1,-1,1, 1,-1,-1,-1,-1,-1,1,1,1,1,-1,-1,1,1,-1,-1,1\}$.
The scrambling sequence may be the same for the I and Q channels. The correlator module 505 may generate I and Q soft correlation metrics as follows.

$$ISoftCor[n] = \sum_{k=0}^{15}(s_k \ast \mathrm{sgn}(w\_i_k)) \ast (s_{k+16} \ast \mathrm{sgn}(w\_i_{k+16})) \ast (|w\_i_k| + |w\_i_{k+16}|) \quad [1]$$

$$QSoftCor[n] = \sum_{k=0}^{15}(s_k \ast \mathrm{sgn}(w\_q_k)) \ast (s_{k+16} \ast \mathrm{sgn}(w\_q_{k+16})) \ast (|w\_q_k| + |w\_q_{k+16}|) \quad [2]$$

The total correlation value for a single sub-code is calculated as $$SubSoftCor[n] = |\mathrm{sgn}(ISoftCor[n]) \ast (ISoftCor[n])^2 + \mathrm{sgn}(QSoftCor[n]) \ast (QSoftCor[n])^2| \quad [3]$$

This sub-code correlation value is stored in a memory and is also added to sub-code correlation values calculated 32 and 64 symbol periods prior to get a correlation for the complete physical layer header as $$SoftCor[n] = SubSoftCor[n] + SubSoftCor[n-32] + SubSoftCor[n-64].$$

For each symbol input, the SoftCor value along with the symbol count value (from the counter block) may be output to the sync control module 510.

The counter module 515 may contain three counters which update at the symbol rate. All counters may be reset to zero at power-up. The following are for purposes of example only, as other counter configurations may be used:

Symbol Counter

The symbol counter is a 14-bit counter that may count through each physical layer frame (counts from 0 to 16295). This counter may be initialized by the sync control module 510 such that the counter is synchronous with the symbol coming into the physical layer frame synchronizer module 510 (count is 0 on the first symbol of each physical layer frame).

Frame Counter

The frame counter is a 16-bit counter that counts frames within a superframe. The counter is initialized to zero when the Frame_Init input is set to a logic level 1 and increments each time the symbol counter rolls over.

Superframe Counter

The superframe counter is a 32-bit counter that counts superframes.

Figure 6:
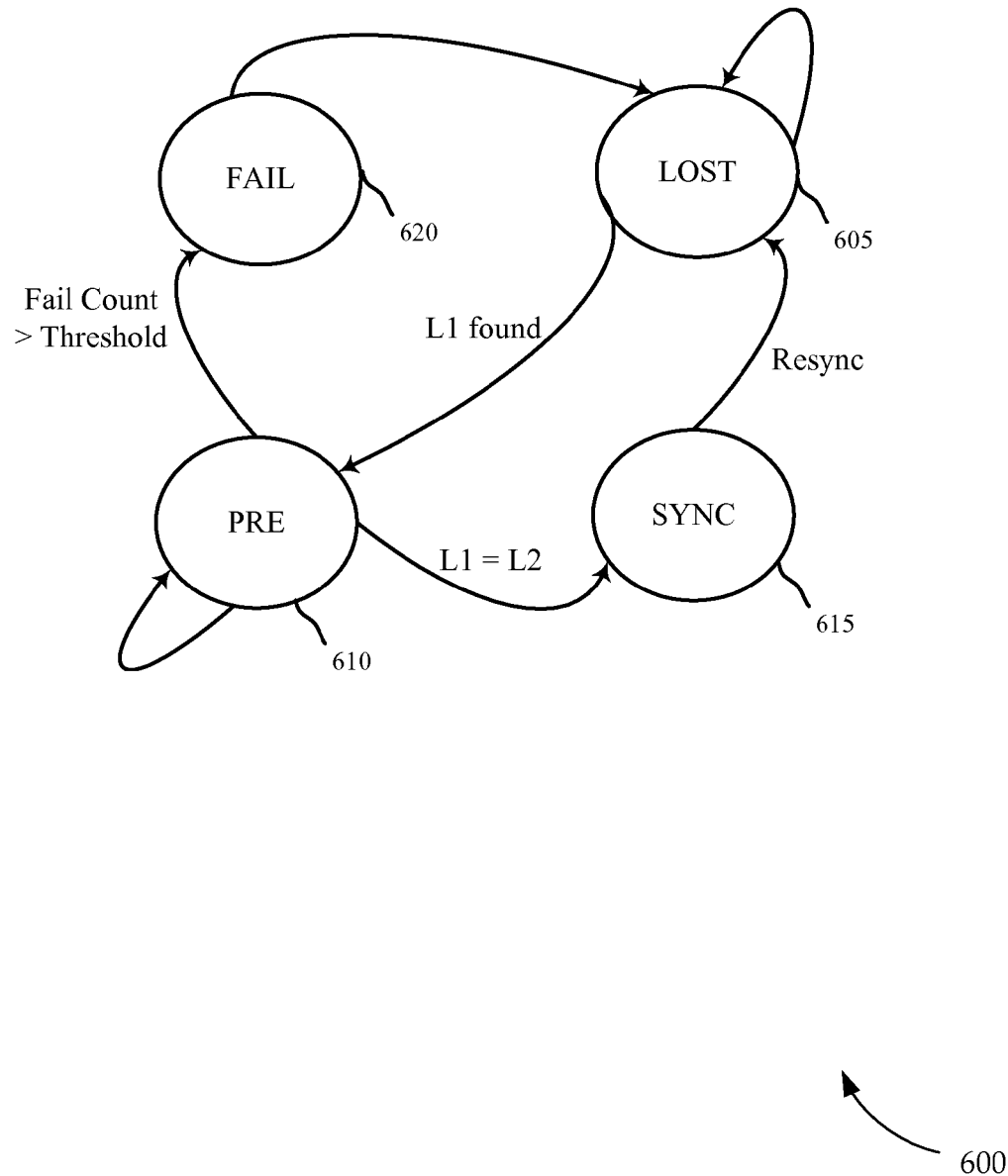
FIG. 6 is a state diagram of a state machine for a user terminal for a satellite communications system configured according to various embodiments of the invention.
Figure 7:
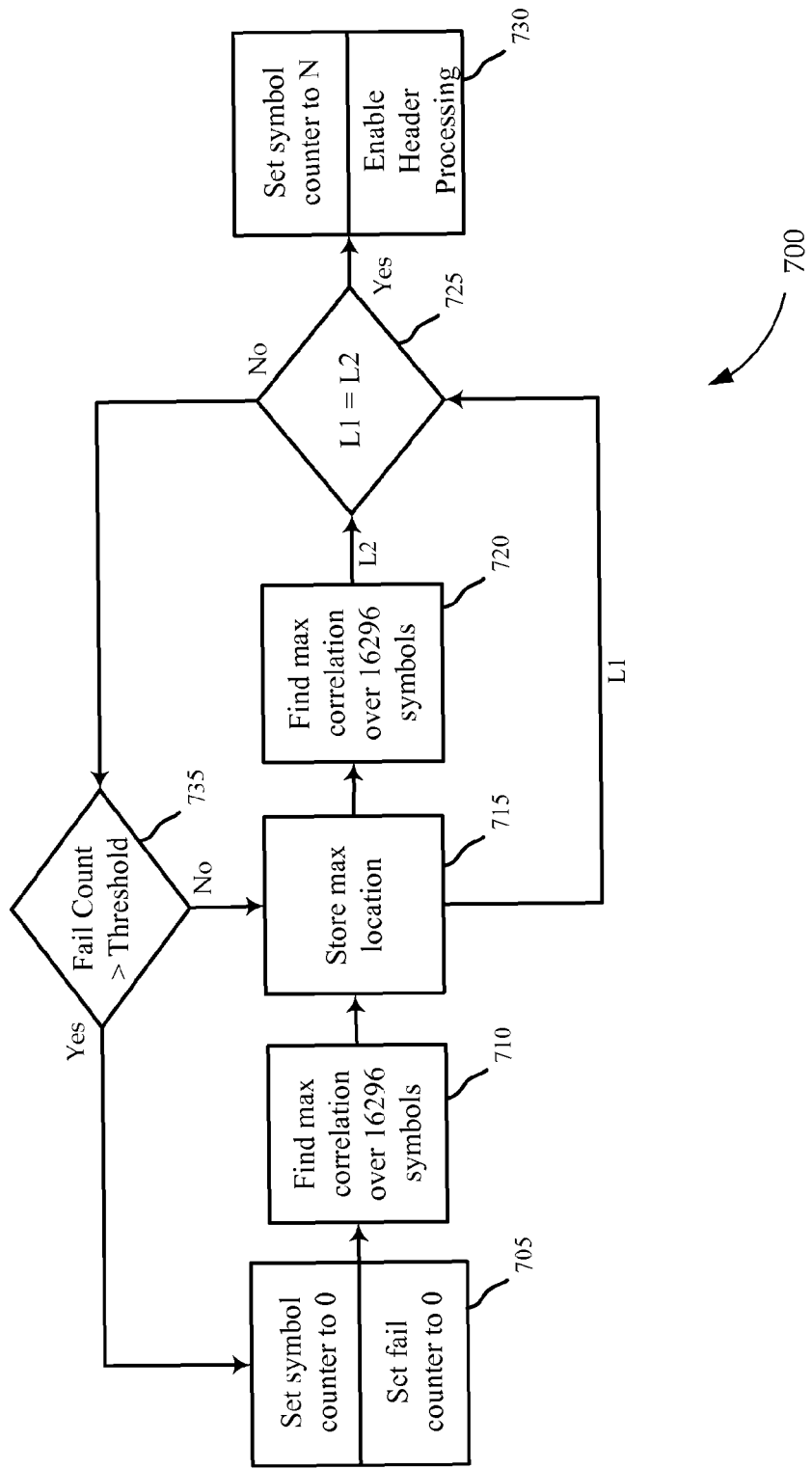
FIG. 7 is a flow diagram of a search function for a user terminal for a satellite communications system configured according to various embodiments of the invention.

The sync control module 510 may contain a small state machine 600 and a max location search function 700, as illustrated in FIGS. 6 and 7. The following synchronization is for purposes of example only, as smaller windows or more or fewer iterations may be undertaken. Moreover, the state machine 600 may be used with any number of other search functions; the illustrated search function 700 may be used in other implementations, as well. The state machine 600 may start in the LOST state 605. In a LOST state 605, the symbol counter and a sync fail counter may both be initialized to 0 at block 705. At block 710, one physical layer frame's worth (16296) of correlation values may be taken in from the correlator to find the maximum correlation value over the frame and identify the symbol location of the maximum correlation. The sync control module 510 may remain within the LOST state 605 until the maximum correlation is found. There may be a threshold correlation required before any transition to another state may be made. When the maximum is found, the state machine 600 transitions to the PRE state 610.

In the PRE state 610, the max location is stored at block 715 A second maximum correlation search is initiated over the next frame's worth (16296) of correlation values and, at block 720, the maximum correlation value over the second frame is found along with the location of the maximum correlation. The location of the second maximum (L2) is compared with the stored location from the first frame (L1) at block 725. If the two locations are not equivalent, the sync fail counter is incremented by one, and a determination is made at block 735 as to whether the sync fail counter exceeds the user defined threshold (set by Fail_Thresh). If the counter is below the threshold, the L2 value is stored as the new L1 value at block 715, and another correlation search is kicked-off over the next physical layer frame period at block 720. This process continues until either L1 and L2 are equivalent, or the threshold is exceeded. If the threshold is exceeded, the state machine transitions to the FAIL state 620. If the L1 and L2 values are equivalent at block 725, the state machine transitions to the SYNC state 615.

The FAIL state 620 transitions back to the LOST state 605 on the next clock, and returns to block 705. The FAIL state 620 is there to signal to other design blocks that the sync control module 510 has failed to achieve sync within the threshold number of physical layer frames. This is an indication of a lack of signal or possibly a spectral inversion. In the SYNC state 615, the symbol counter is initialized to N and header processing is enabled at block 730. The N value may be determined such that the symbol counter is synchronous with the start of the physical layer frame. The state machine will remain in the SYNC state 615 unless a Resync input is set to logic level 1.

Figure 8A:
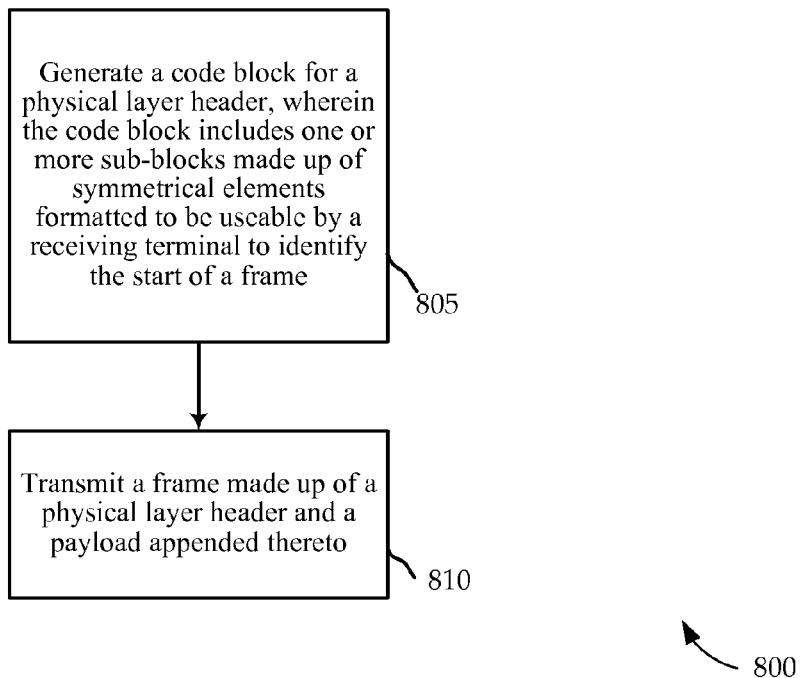
FIG. 8A is a flowchart illustrating a method for generating a physical layer header according to various embodiments of the invention.

Referring next to FIG. 8A, a flowchart is shown illustrating a method 800 for generating a physical layer header according to various embodiments of the invention. The method 800 may be performed, for example, in whole or in part, by the gateway 115 described with reference to FIG. 1 or 3.

At block 805, a code block for a physical layer header is generated, wherein the code block includes one or more sub-blocks made up of symmetrical elements formatted to be useable by a receiving terminal to identify the start of a frame. At block 810, a frame made up of a physical layer header and a payload appended thereto is transmitted.

Figure 8B:
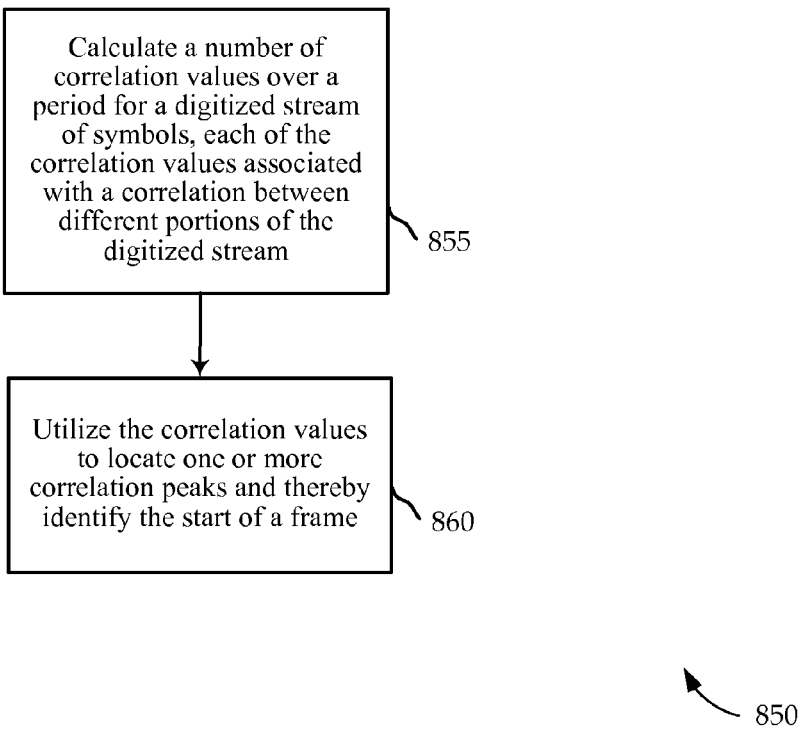
FIG. 8B is a flowchart illustrating a method for identifying a start of a frame according to various embodiments of the invention.

At FIG. 8B, a flowchart is shown illustrating a method 850 for identifying a start of a frame according to various embodiments of the invention. The method 850 may be performed, for example, in whole or in part, by the terminal 130 described with reference to FIG. 1 or 4 or, more specifically, with the header processing module 410 of FIG. 4 or 5.

At block 855, a number of correlation values are calculated over a period for a digitized stream of symbols (this may be a received version of the frame transmitted at block 810), each of the correlation values associated with a correlation between different portions of the digitized stream. At block 860, the correlation values are utilized to locate one or more correlation peaks and thereby identify the start of a frame.

Figure 9:
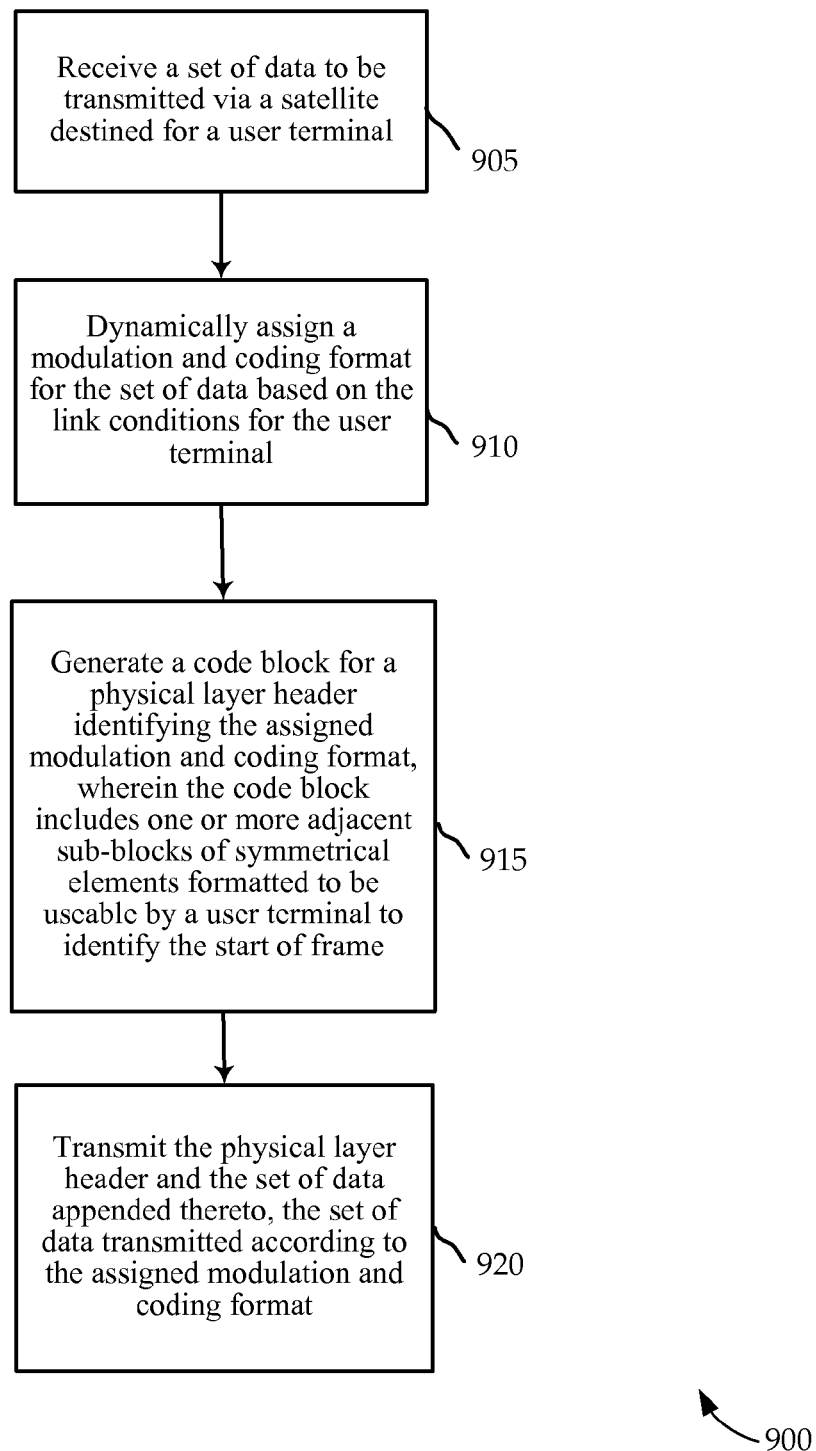
FIG. 9 is a flowchart illustrating a method for generating and transmitting a physical layer frame according to various embodiments of the invention.

Referring next to FIG. 9, a flowchart is shown illustrating a method 900 for generating and transmitting a physical layer frame according to various embodiments of the invention. The method 900 may be performed, for example, in whole or in part, by the gateway 115 described with reference to FIG. 1 or 3.

At block 905, a set of data to be transmitted via a satellite destined for a user terminal is received. At block 910, a modulation and coding format for the set of data is dynamically assigned based on the link conditions for the user terminal. At block 915, a code block identifying the assigned modulation and coding format is generated for a physical layer header, wherein the code block includes one or more adjacent sub-blocks of symmetrical elements formatted to be useable by the user terminal to identify the start of frame. At block 920, the physical layer header and the set of data appended thereto are transmitted, the set of data transmitted according to the assigned modulation and coding format.

Figure 10:
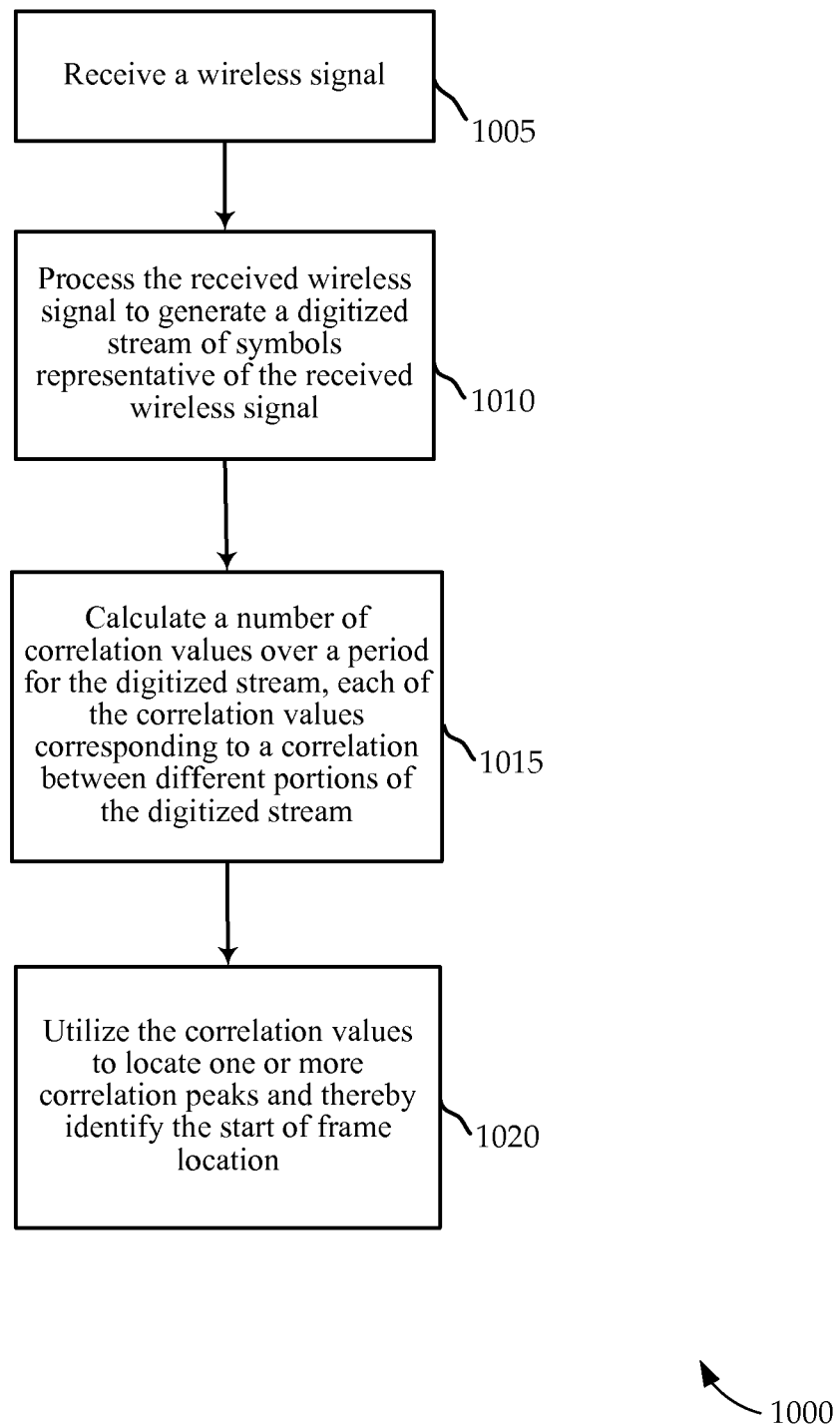
FIG. 10 is a flowchart illustrating a method for identifying a start of a frame for a received wireless signal according to various embodiments of the invention.

At FIG. 10, a flowchart is shown illustrating a method 1000 for identifying a start of a frame for a received wireless signal according to various embodiments of the invention. The method 1000 may be performed, for example, in whole or in part, by the terminal 130 described with reference to FIG. 1 or 4 or, more specifically, with the header processing module 410 of FIG. 4 or 5.

At block 1005, a wireless signal is received (this may be a received version of the transmission described at block 810 or at block 920). At block 1010, the received wireless signal is processed to generate a digitized stream of symbols representative of the received wireless signal. At block 1015, a number of correlation values are calculated over a period for the digitized stream, each of the correlation values corresponding to a correlation between different portions of the digitized stream. At block 1020, the correlation values are utilized to locate one or more correlation peaks and thereby identify the start of frame location.

Figure 11:
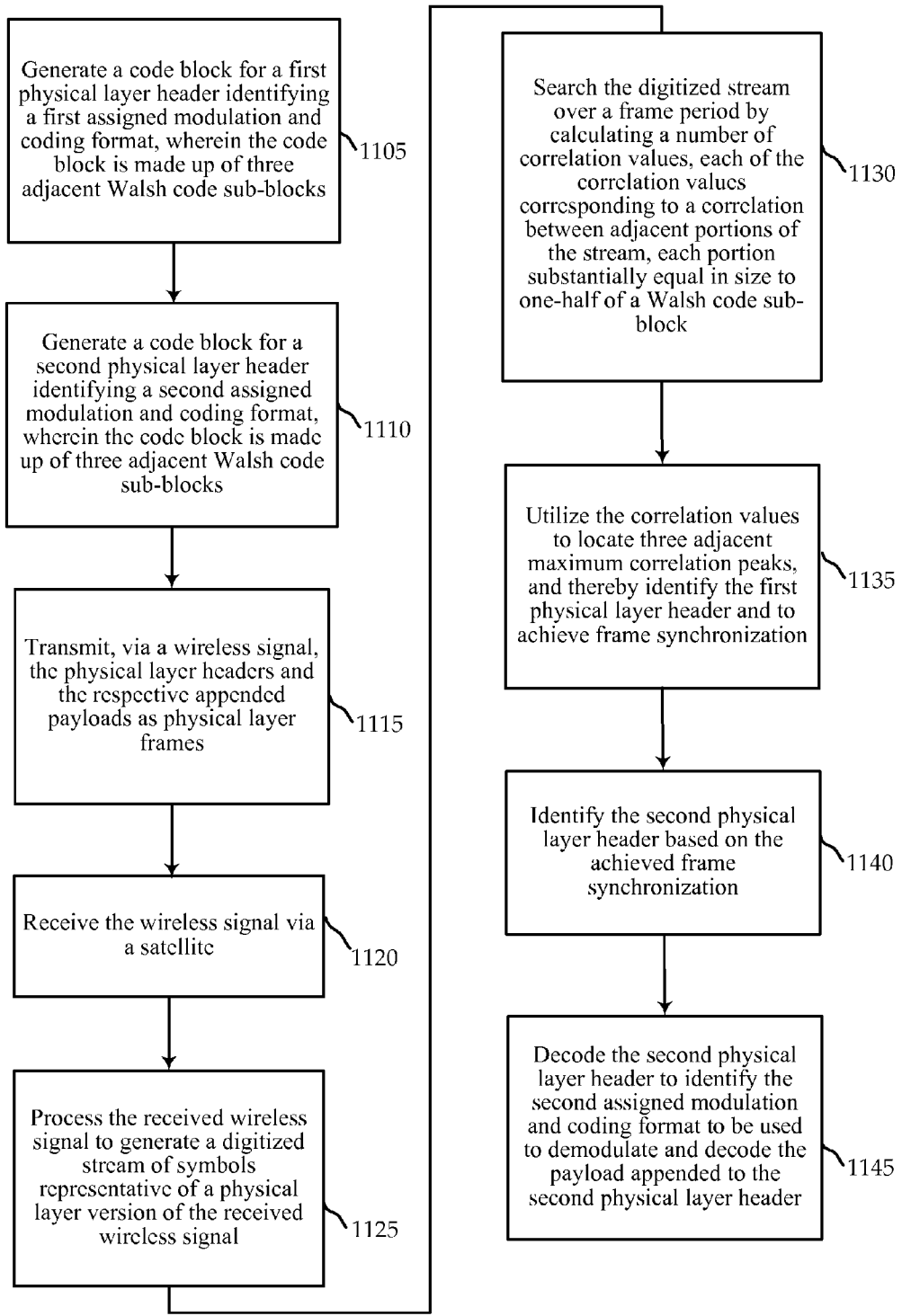
FIG. 11 is a flowchart illustrating a method for frame synchronization according to various embodiments of the invention.

Referring to FIG. 11, a flowchart is shown illustrating a method 1100 for frame synchronization according to various embodiments of the invention. The method 1100 may be performed, for example, in whole or in part, by the terminal 130 described with reference to FIG. 1 or 4 and the gateway 115 described with reference to FIG. 1 or 3.

At block 1105, a code block is generated for a first physical layer header identifying a first assigned modulation and coding format, wherein the code block is made up of three adjacent Walsh code sub-blocks. At block 1110, a code block is generated for a second physical layer header identifying a second assigned modulation and coding format, wherein the code block is made up of three adjacent Walsh code sub-blocks. At block 1115, the physical layer headers and the respective appended payloads are transmitted as physical layer frames via a wireless signal.

At block 1120, the wireless signal is received via a satellite. At block 1125, the received wireless signal is processed to generate a digitized stream of symbols representative of a physical layer version of the received wireless signal. At block 1130, the digitized stream is searched over a frame period by calculating a number of correlation values, each of the correlation values corresponding to a correlation between adjacent portions of the stream, each portion substantially equal in size to one-half of a Walsh code sub-block. At block 1135, the correlation values are utilized to locate three adjacent maximum correlation peaks, and thereby identify the first physical layer header and to achieve frame synchronization.

At block 1140, the second physical layer header is identified based on the achieved frame synchronization. At block 1145, the second physical layer header is decoded to identify the second assigned modulation and coding format to be used to demodulate and decode the payload appended to the second physical layer header.

II. Physical Layer Header Decoding:

Once a location of a physical layer header is identified (or otherwise estimated), data in the physical layer header may be decoded. As described above, the location of a physical layer header may be identified using the code blocks of the physical layer header; these code blocks may also include signaling information for the payload of the frame.

Thus, the novel format for the physical layer headers described herein may serve multiple functions. Each header may be formatted for use in frame synchronization and also include signaling information. Consider, for example, the physical layer header 205 from a physical layer frame 200 of FIG. 2A or 2B, received by a user terminal 130 via satellite 105 from a gateway 115 of FIG. 1. Code blocks (e.g., Walsh code blocks 215, 220 of FIG. 2) may be processed to identify a start of frame location, and may also be decoded (e.g., via a fast hadamard transform (FHT) function, described in more detail below) to identify a sub-channel identifier and a modulation and coding format attributable to the payload of the frame.

Figure 12:
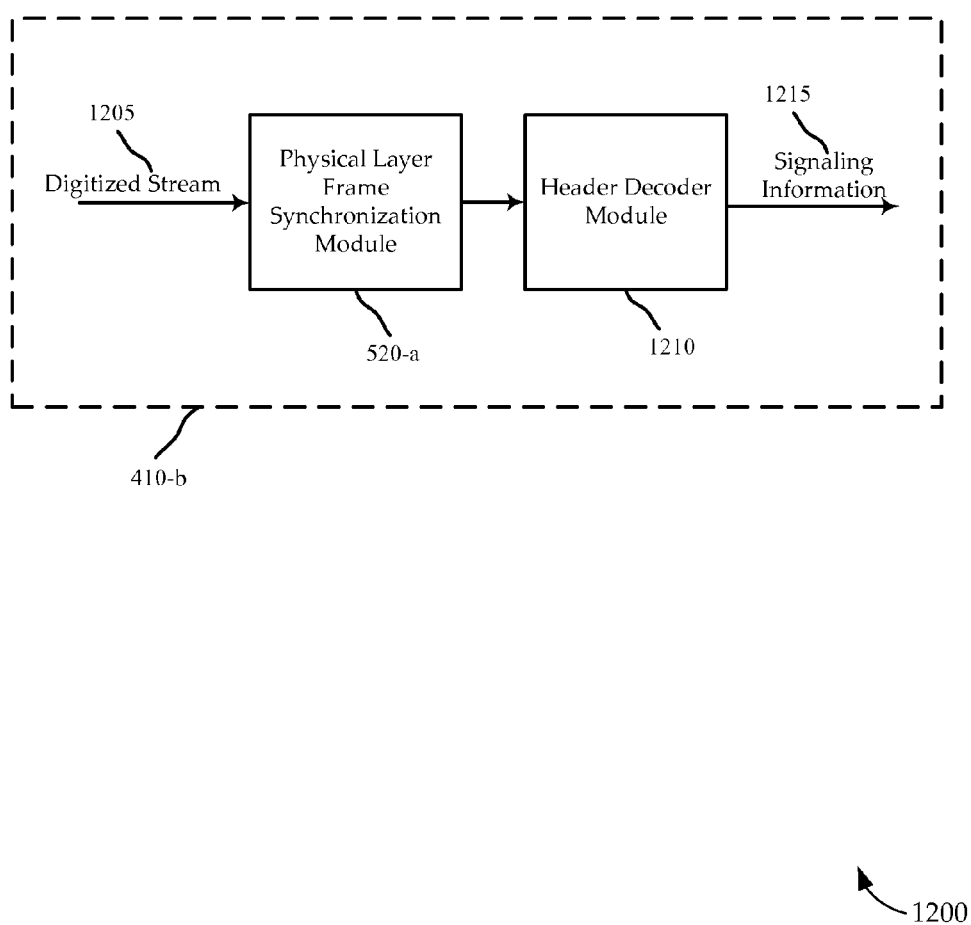
FIG. 12 is a block diagram of a header processing module configured according to various embodiments of the invention.

Turning to FIG. 12, a block diagram 1200 illustrating an example of a header processing module 410-b is shown. This may be the header processing module 410 of FIG. 4 or 5. Thus, the header processing module 410-b may receive a digitized stream of symbols 1205 representative of a received wireless signal. This digitized stream 1205 may be made up of in-phase and quadrature components.

The header processing module 410-b may include a physical layer frame synchronization module 520-a and a header decoder module 1210. As described above, the physical layer frame synchronization module 520-a may search the received wireless signal for a code block (e.g., Walsh code blocks 215, 220 of FIG. 2) of a physical layer header corresponding to a start of frame location, and process the code block to identify a start of frame location. The code block used for frame synchronization also includes signaling information attributable to the payload of the frame.

The header decoder module 1210 may be configured to decode the code block to identify and output signaling information 1215. The header decoder module 1210 may decode the code block utilizing a fast hadamard transform function on each of a number of sub-blocks making up the code block to thereby identify a maximum likelihood transmitted data pattern. By way of example, a header decoder module 1210 may extract sub-channel identifier (e.g., a physical stream identified(PSID)) and modulation and coding (e.g., MOD-COD) information for each physical layer frame. In one embodiment, a programmable lookup table (not shown) in the header processing module 410-b may also convert a modulation and coding data value into a set of configuration parameters for demodulation and decoding of the frame. Thus, the information in the physical layer header may dictate whether, and how, the payload of a physical layer frame is to be demodulated and decoded. A header processing module 410-b may also calculate an Es/No estimate or other signal quality measurement for each physical layer header, and provide frequency and/or phase error information for a physical layer payload.

In one set of embodiments, physical layer header data (e.g., from physical layer header 205 of FIG. 2A or 2B) enters the header decoder module 1210, and each code block (or code sub-block) therein is processed to generate decoded data. For example, if the 96 symbol physical layer header data (e.g., Walsh codes 215, 220 from FIG. 2B) enters the header decoder module 1210, each of the code sub-blocks (e.g., three 32-symbol codes) get decoded (e.g., via a fast hadamard transform (FHT) function), and the results are then stored. In one embodiment, two of the Walsh code sub-blocks include the signaling information and one of the code sub-blocks includes the parity information. A max correlation search may identify the most likely transmitted coded word set and output statistics from the winning FHT bins, thereby identifying the sub-channel identifier and modulation and coding information.

In some embodiments, a series of physical layer frames is received, and thus header processing module 410-b may process a number of physical layer headers in succession. The physical layer frame synchronization module 520-a may identify start of frame locations for a first set of received physical layer frames to achieve frame synchronization. The frame synchronization may the allow additional physical layer headers arriving thereafter to be identified. The header decoder module 1210 may then decode the code blocks of these identified physical layer headers to output signaling information 1215 for each respective payload.

Figure 13:
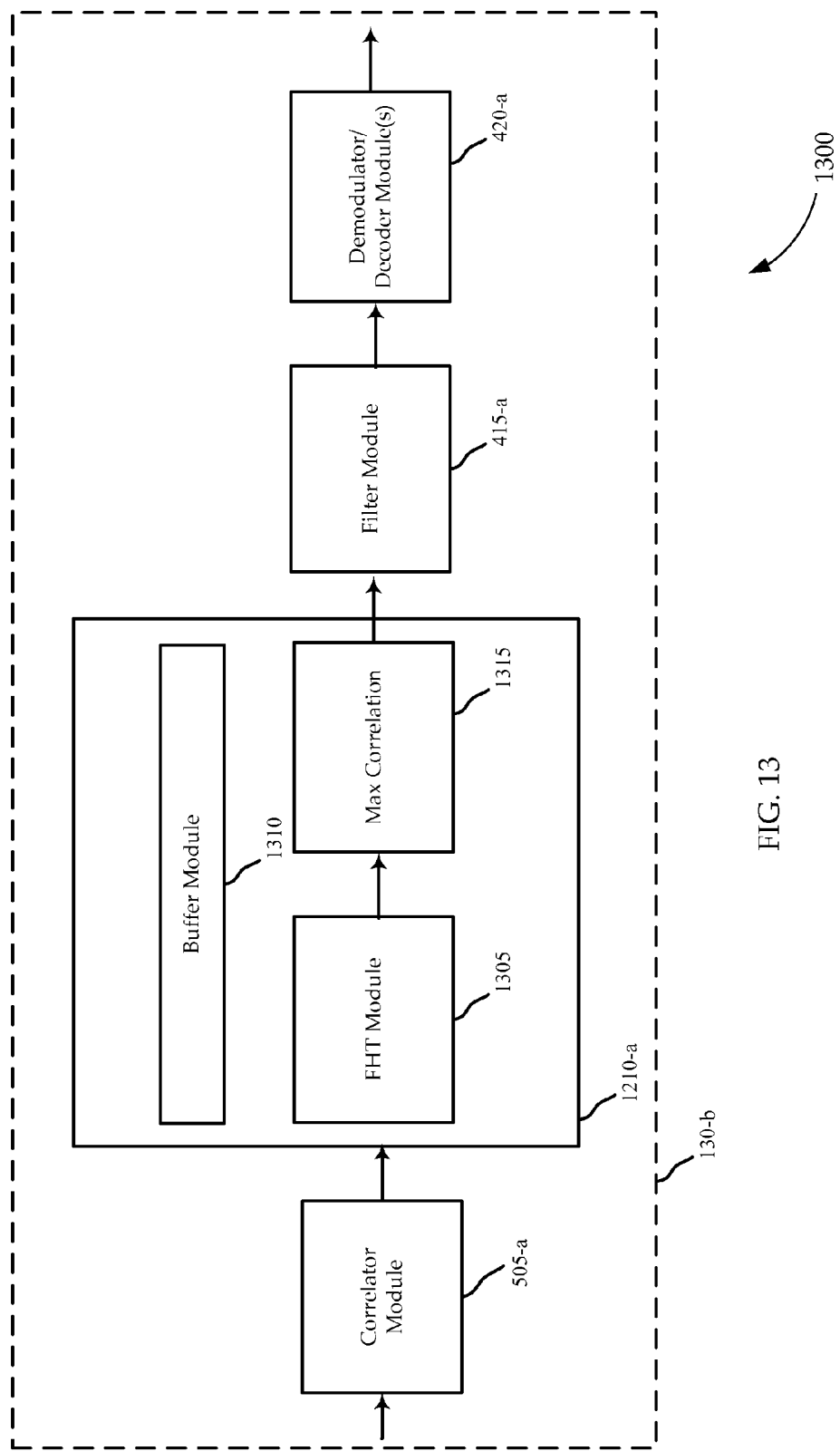
FIG. 13 is a block diagram of a user terminal to process physical layer headers according to various embodiments of the invention.

Turning next to FIG. 13, a block diagram 1300 is shown illustrating an example of a terminal 130-b. This may, but need not be, the terminal 130 of FIG. 1 or 4. In this embodiment, the terminal 130-b includes a correlator module 505-a, a header decoder module 1210-a, a filter module 415-a, and demodulator/decoder module(s) 420-a. The header decoder module 1210-a includes an FHT unit 1305, a buffer unit 1310, and a max correlation unit 1315. In the following example, physical layer frame 200-a of FIG. 2B will be used for purposes of example. The correlator module 505-a may receive a stream of physical layer frames 200, and search for the three Walsh code blocks 215, 220 at the start of each physical layer frame. The correlator module 505-a may thereby acquire frame synchronization. With frame synchronization achieved, the physical layer header of each frame 200 may be forwarded (or otherwise accessed by) the header decoder module 1210-a.

In one embodiment, for each of the (32,5) Walsh code blocks of each header 205-a, a fast hadamard transform function is undertaken by the FHT module 1305 to perform the decoding. The output of each FHT process (for each of the (32,5) Walsh code blocks) is a vector of 32 complex correlation values with each element corresponding to one of the possible 32 data patterns. Let the three FHT result vectors (one for each block) be F1, F2, and F3 defined as follows:

$$Fn=\{fn_0, fn_1, \ldots, fn_{31}\} \text{ where } n=1, 2, 3$$

with each element of Fn defined as a complex pair $fn_i = (fn\_i_i, fn\_q_i)$. Thus, a total of 6 FHTs may be performed (I and Q for each block), and the results may be stored in the buffer module 1310.

The next step in the physical layer header processing may be to have the max correlation unit 1315 perform a three sample correlation over 1024 possible code points and perform a max search to find the most likely transmitted codeword. In one embodiment, the physical layer header contains 10 bits of information (e.g., the sub-channel identifier (e.g., PSID) and modulation and coding (e.g., MODCOD information) carried in the first two (32, 5) Walsh codes. A third 32-symbol Walsh code includes redundancy information (e.g., the value in the third code block may be calculated at the gateway according to a predetermined formula, the value determined based on the 10 bits of information in the first two Walsh codes).

To find the maximum likelihood transmitted data pattern, there are a number of different options. In one embodiment, the results from the three FHTs may be combined (correlated) and the max correlation is declared the winning pattern. The search is over all combinations of results from F1 and F2 so the range is:

$$\{f1_j, f2_k\} \text{ where } j=0, 1, \ldots, 31 \text{ and } k=0, 1, \ldots, 31$$

For each of the 1024 points in the search range, the correlation is calculated in steps as $$C\_I[j,k]=(f1\_i_j+f2\_i_k+f3\_i_l)$$

$$C\_Q[j,k]=(f1\_q_j+f2\_q_k+f3\_q_l)$$

$$C[j,k]=C\_I^2+C\_Q^2$$

In one embodiment, the third point in each correlation ($f3_l$) is chosen (e.g., at the gateway) such that Mod(l+j+k, 32)=0.

For each correlation point the correlation value may be compared against the current maximum (current maximum is initialized to 0 at start of each frame). If the correlation point is larger than the current maximum, C is made the new maximum and C, C_I, C_Q, j, and k are stored. The C_I and C_Q values may be used to generate a phase estimate for the header. The index of the maximum correlation values generates the 10-bits of information that become the sub-channel identifier and modulation and coding field(s) for the current physical layer frame. The data extraction may proceed as follows:
{j[4:0],k[4:0]}→PHYSICALLAYERHeaderBits[9:0]
{MODCODE[5:0],SUB-CHANNELID[3:0]}

It is worth noting that although the three Walsh codes blocks 215-*a*, 215-*b*, and 220 of FIG. 2B are used for purposes of example, in other embodiments there may be a longer or shorter physical layer header, more or fewer code blocks, more or less information in the physical layer header, different types of information in the physical layer header, different types of parity or redundancy information, and other types of codes (which may, but need not have a symmetrical or asymmetrical structure).

The filter module 415-*a* may forward (or filter) the physical layer payload associated with the respective physical layer header to the demodulator/decoder module(s) 420 (e.g., based on the PSID included in the signaling information). The filter module 415 and the demodulator/decoder module(s) 420 need not be included in some embodiments.

In still other embodiments, other decoding techniques may be used. For example, a max bin search may be performed over each (or a subset) of the code blocks (e.g., the individual 32-symbol codes). If the winning sub-code correlation bins (e.g., the first two Walsh code blocks) match the winning redundancy correlation bins (e.g., the third Walsh code block), the winning bins may identify the decoded header information (e.g., instead of performing the three sample correlation over 1024 possible code points and performing a max search to find the most likely transmitted codeword).

Figure 14A:
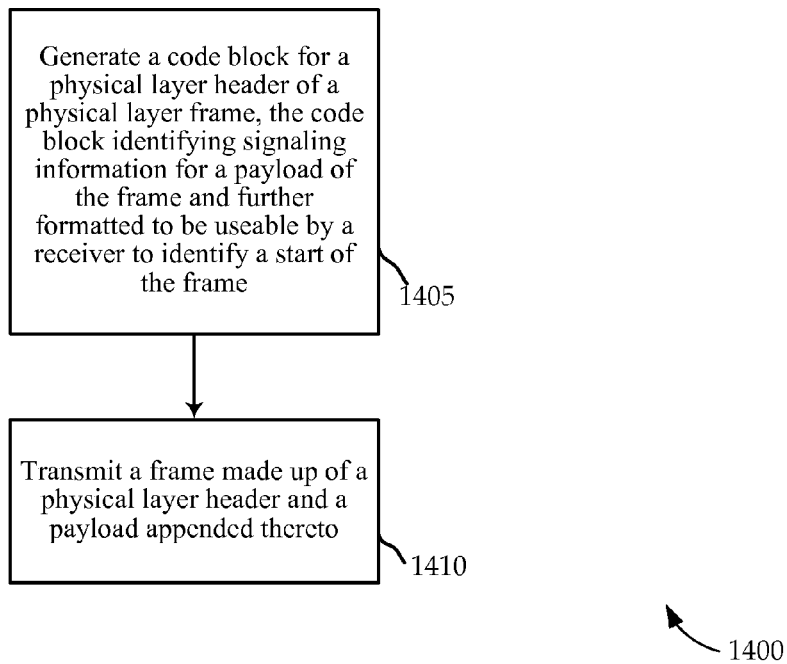
FIG. 14A is a flowchart illustrating a method for generating a physical layer header according to various embodiments of the invention.

Referring next to FIG. 14A, a flowchart is shown illustrating a method 1400 for generating a physical layer header according to various embodiments of the invention. The method 1400 may be performed, for example, in whole or in part, by the gateway 115 described with reference to FIG. 1 or 3.

At block 1405, a code block for a physical layer header of a physical layer frame is generated, the code block identifying signaling information for a payload of the frame and further formatted to be useable by a receiver to identify a start of the frame. At block 1410, a frame is transmitted, the frame including a physical layer header and a payload appended thereto.

Figure 14B:
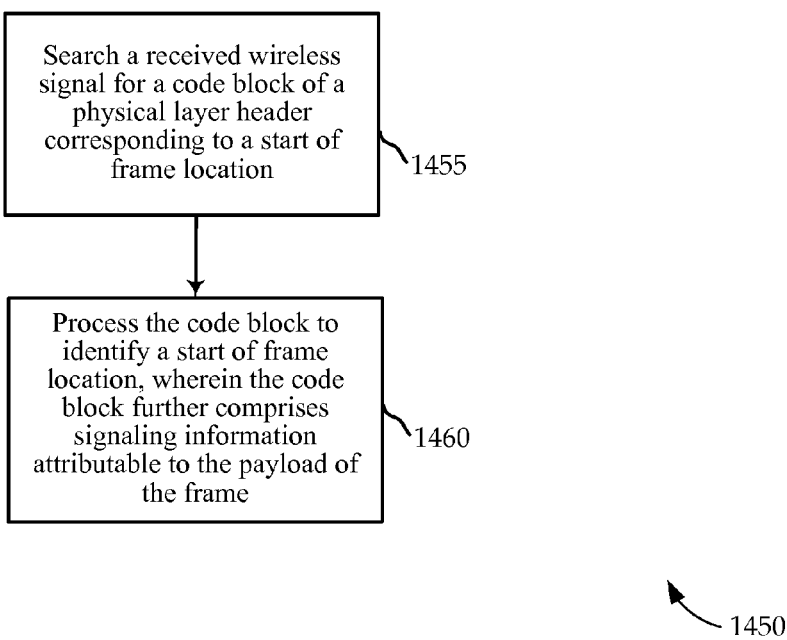
FIG. 14B is a flowchart illustrating a method for utilizing a physical layer header according to various embodiments of the invention.

At FIG. 14B, a flowchart is shown illustrating a method 1450 for utilizing a physical layer header according to various embodiments of the invention. The method 1450 may be performed, for example, in whole or in part, by the terminal 130 described with reference to FIG. 1, 4, or 13 or, more specifically, with the header processing module 410 of FIG. 4, 5, or 12.

At block 1455, a received wireless signal is searched for a code block of a physical layer header corresponding to a start of frame location. At block 1460, the code block is processed to identify a start of frame location, wherein the code block further includes signaling information attributable to the payload of the frame.

Figure 15:
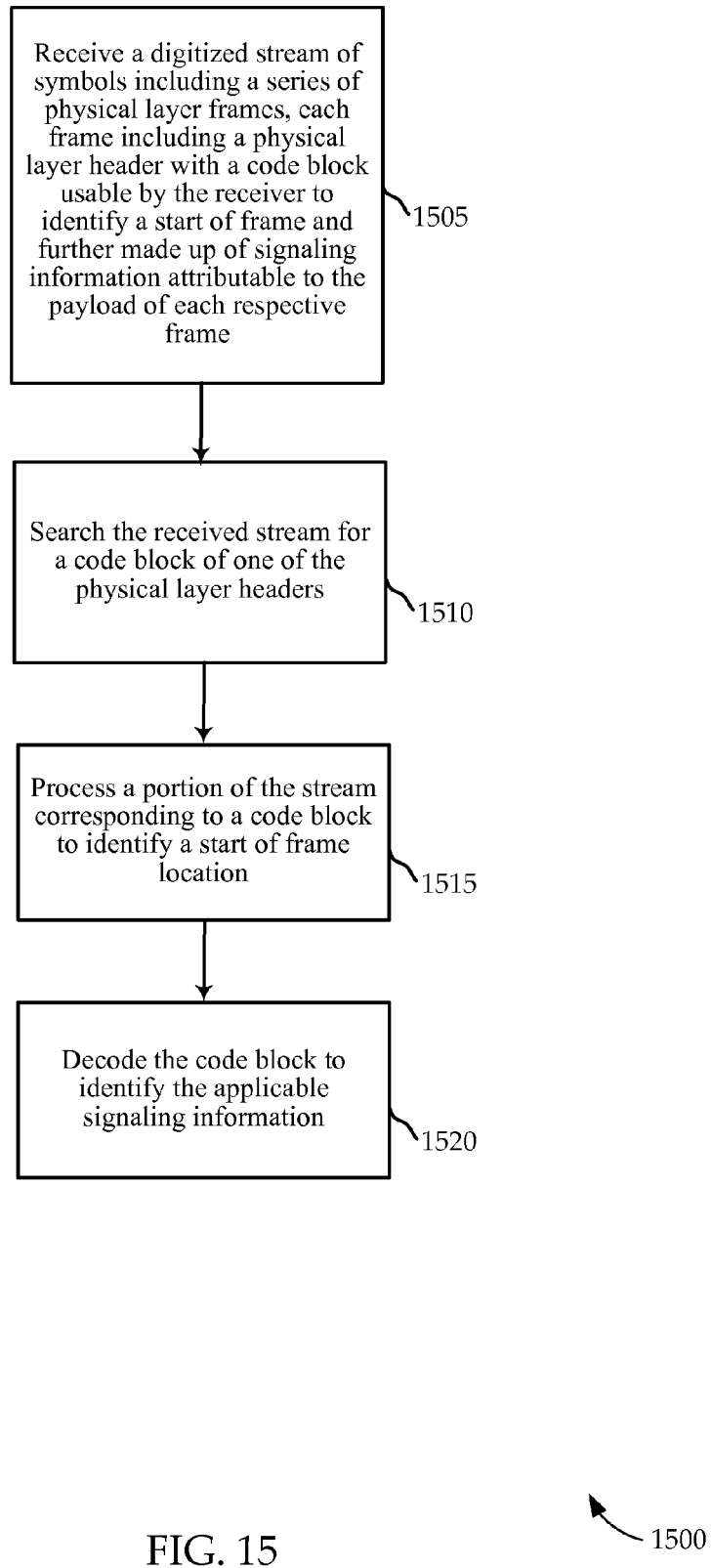
FIG. 15 is a flowchart illustrating a method for utilizing a code block according to various embodiments of the invention.

At FIG. 15, a flowchart is shown illustrating a method 1500 for utilizing a code block according to various embodiments of the invention. The method 1500 may be performed, for example, in whole or in part, by the terminal 130 described with reference to FIG. 1, 4, or 13 or, more specifically, with the header processing module 410 of FIG. 4, 5, or 12.

At block 1505, a digitized stream of symbols is received, made up of a series of physical layer frames. Each frame includes a physical layer header with a code block usable by the receiver to identify a start of frame, the code block further including signaling information attributable to the payload of each respective frame. At block 1510, the received stream is searched for a code block of one of the physical layer headers. At block 1515, a portion of the stream corresponding to a code block is processed to identify a start of frame location. At block 1520, the code block is decoded to identify the applicable signaling information.

Figure 16:
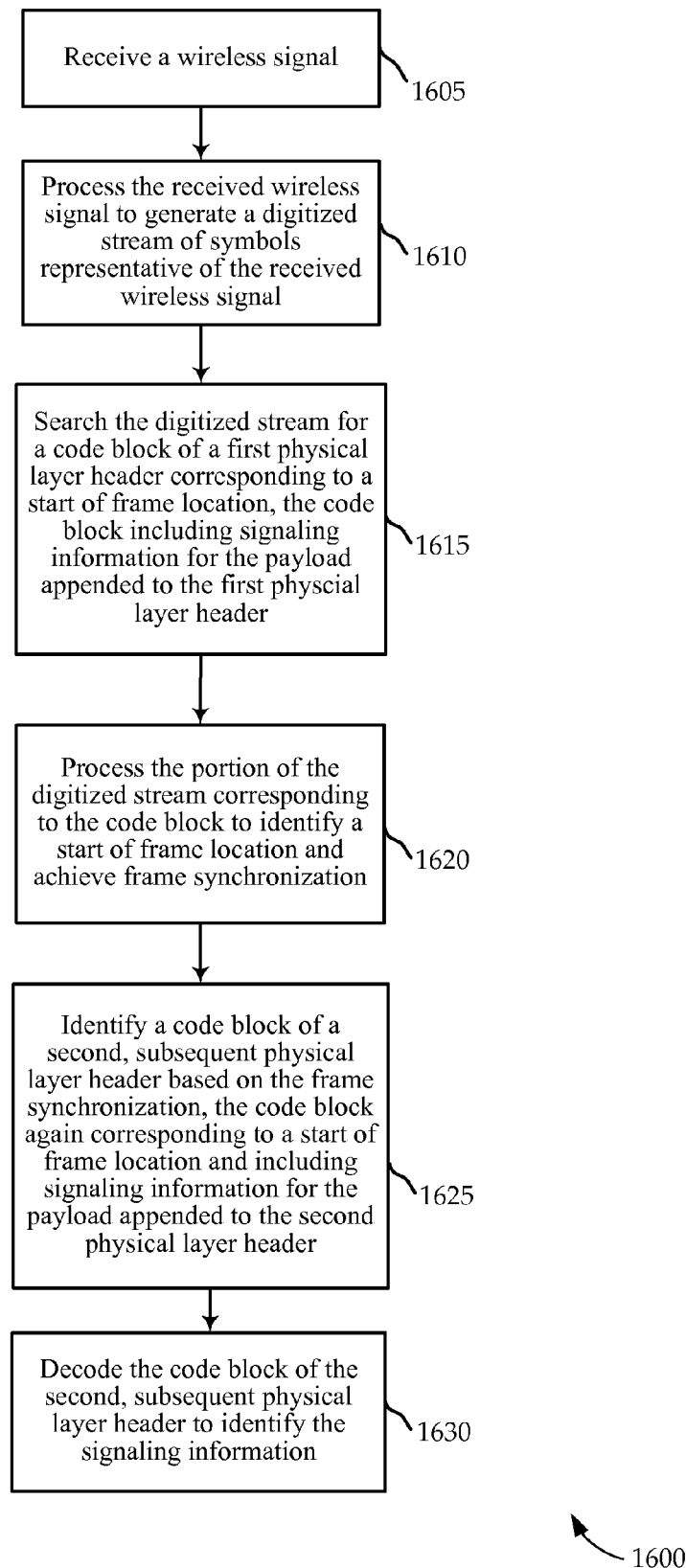
FIG. 16 is a flowchart illustrating a method for utilizing code blocks for frame synchronization and signaling according to various embodiments of the invention.

At FIG. 16, a flowchart is shown illustrating a method 1600 for utilizing code blocks for frame synchronization and signaling according to various embodiments of the invention. The method 1600 may be performed, for example, in whole or in part, by the terminal 130 described with reference to FIG. 1, 4, or 13 or, more specifically, with the header processing module 410 of FIG. 4, 5, or 12.

At block 1605, a wireless signal is received. At block 1610, the received wireless signal is processed to generate a digitized stream of symbols representative of the received wireless signal. At block 1615, the digitized stream is searched for a code block of a first physical layer header corresponding to a start of frame location, the code block including signaling information for the payload appended to the first physical layer header.

At block 1620, the portion of the digitized stream corresponding to the code block is processed to identify a start of frame location and achieve frame synchronization. At block 1625, a code block of a second, subsequent physical layer header is identified based on the frame synchronization, the code block again corresponding to a start of frame location and including signaling information for the payload appended to the second physical layer header. At block 1630, the code block of the second, subsequent physical layer header is decoded to identify the signaling information.

Figure 17:
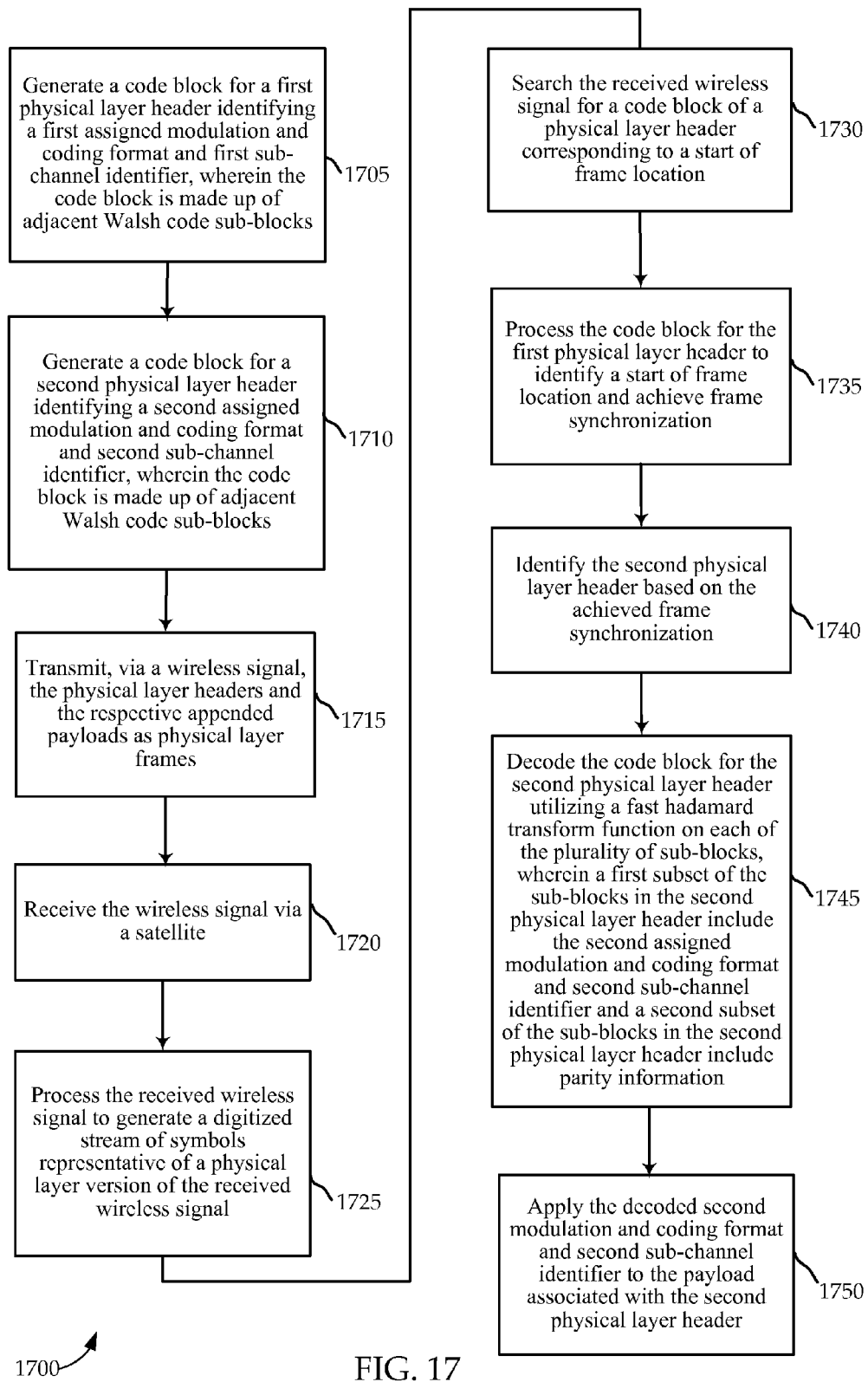
FIG. 17 is a flowchart illustrating a method for frame synchronization according to various embodiments of the invention.

Referring to FIG. 17, a flowchart is shown illustrating a method 1700 for frame synchronization according to various embodiments of the invention. The method 1700 may be performed, for example, in whole or in part, by the terminal 130 described with reference to FIG. 1, 4, or 13 and the gateway 115 described with reference to FIG. 1 or 3.

At block 1705, a code block for a first physical layer header is generated identifying a first assigned modulation and coding format and first sub-channel identifier, wherein the code block is made up of adjacent Walsh code sub-blocks. At block, 1710, a code block for a second physical layer header is generated identifying a second assigned modulation and coding format and second sub-channel identifier, wherein the code block is made up of adjacent Walsh code sub-blocks. At block 1715, the physical layer headers and the respective appended payloads are transmitted via a wireless signal as physical layer frames.

At block 1720, the wireless signal is received via a satellite. At block 1725, the received wireless signal is processed to generate a digitized stream of symbols representative of a physical layer version of the received wireless signal. At block 1730, the received wireless signal is searched for a code block of a physical layer header corresponding to a start of frame location. At block 1735, the code block for the first physical layer header is processed to identify a start of frame location and achieve frame synchronization.

At block 1740, the second physical layer header is identified based on the achieved frame synchronization. At block 1745, the code block for the second physical layer header is decoded utilizing a fast hadamard transform function on each of the plurality of sub-blocks, wherein a first subset of the sub-blocks in the second physical layer header includes the second assigned modulation and coding format and a second sub-channel identifier and a second subset of the sub-blocks in the second physical layer header includes parity information. At block 1750, the decoded second modulation and coding format and second sub-channel identifier to the payload associated with the second physical layer header are applied.

A number of examples above show that a first physical layer header is used for synchronization, and a second physical layer header is used for decoding and processing. It is worth noting that this synchronization process may occur over one, or more, physical layer frame headers (e.g., synchronization may occur over N frames). Also, as noted above, the synchronization and decoding both may occur for the same physical layer header. The decoding process may also occur for each, or only a subset, of the physical layer headers after the initial synchronization.

III. False Lock Detection:

In one embodiment, a false synchronization lock may be detected over a series of frames. To do so, a physical layer header may be decoded according to a first decoding technique (e.g., using a fast hadamard transform (FHT) function to find a maximum likelihood transmitted data pattern) to identify signaling information attributable to a payload of the selected frame. The physical layer header (or a portion thereof) may then be decoded according to a second decoding technique (e.g., using an FHT function on each code block or sub-code block). The results may be compared, and an error value may be generated when the compared results do not match.

By way of example, one decoding technique may be done by performing a max bin search over each (or a subset) of the code blocks (e.g., the three individual 32-symbol code blocks 215, 220 of FIG. 2B). The results may be compared against the full header decoder results. If each of the three winning sub-code correlation bins does not match the winning bins from the overall correlation, then an error value may be stored. When the accumulated error value exceeds a threshold, a false synchronization lock indication may be triggered, and the physical layer frame synchronization search may be re-initialized.

Figure 18:
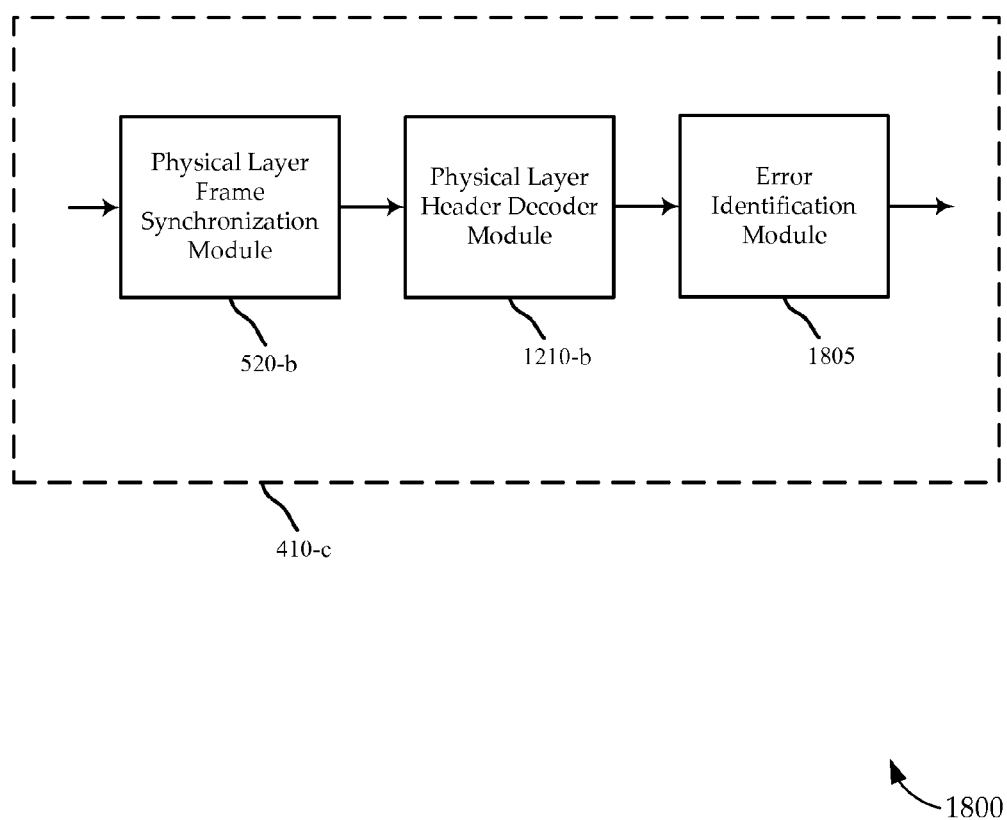
FIG. 18 is a block diagram of components for generating error values related to frame synchronization according to various embodiments of the invention.

Turning to FIG. 18, a block diagram 1800 illustrating an example of a header processing module 410-c is shown. This may be the header processing module 410 of FIG. 4, 5, or 12. Thus, the header processing module 410-c may receive a digitized stream of symbols 1205 representative of a received wireless signal. This digitized stream may be made up of in-phase and quadrature components.

The header processing module 410-c may include a physical layer frame synchronization module 520-b, a physical layer header decoder module 1210-b, and an error identification module 1805. As described above, the physical layer frame synchronization module 520-b may search the received wireless signal for a code block (e.g., Walsh code blocks 215, 220 of FIG. 2) of a physical layer header corresponding to a start of frame location, and process the code block to identify a start of frame location. The code block used for frame synchronization also includes signaling information attributable to the payload of the frame.

The physical layer header decoder module 1210-b may be configured to decode the code block to identify and output signaling information 1215. The header decoder module 1210-b may decode the code block utilizing a fast hadamard transform function on each of a number of sub-blocks making up the code block to thereby identify a maximum likelihood transmitted data pattern. By way of example, a physical layer header decoder module 1210-b may extract sub-channel identifier (e.g., PSID) and modulation and coding (e.g., MODCOD) information for each physical layer frame. By way of example, if the Walsh codes 215, 220 from FIG. 2B enter the header decoder module 1210-b, each of the code sub-blocks (e.g., three 32-symbol codes) get decoded (e.g., via a fast hadamard transform (FHT) function), and the results are then stored. In one embodiment, two of the Walsh code sub-blocks include the signaling information and one of the Walsh code sub-blocks includes parity information.

The physical layer header decoder module 1210-b may, in one embodiment, initially use a first decoding technique. The first technique may be performed by doing a max correlation search to identify the most likely transmitted coded word set over the entire code block, thereby identifying the sub-channel identifier and modulation and coding information.

The error identification module 1805 may use a second decoding technique for purposes of determining whether there is a false synchronization lock. The error identification module 1805 may use the results from performing the FHT function on the code sub-blocks, and perform a max bin search over each (or a subset) of the code sub-blocks to determine the max for each separately. The error identification module 1805 may compare results from the first technique to results of the second technique, and generate an error value when the compared results do not match. The degree of error may be factored into the error value. For example, if two out of three winning bins are maximums, the error value could be moderated. Similarly, if the winning bins are not a maximum but are relatively close, the error value could be moderated. Those of skill in the art will recognize the different ways in which the error value may be scaled.

Figure 19:
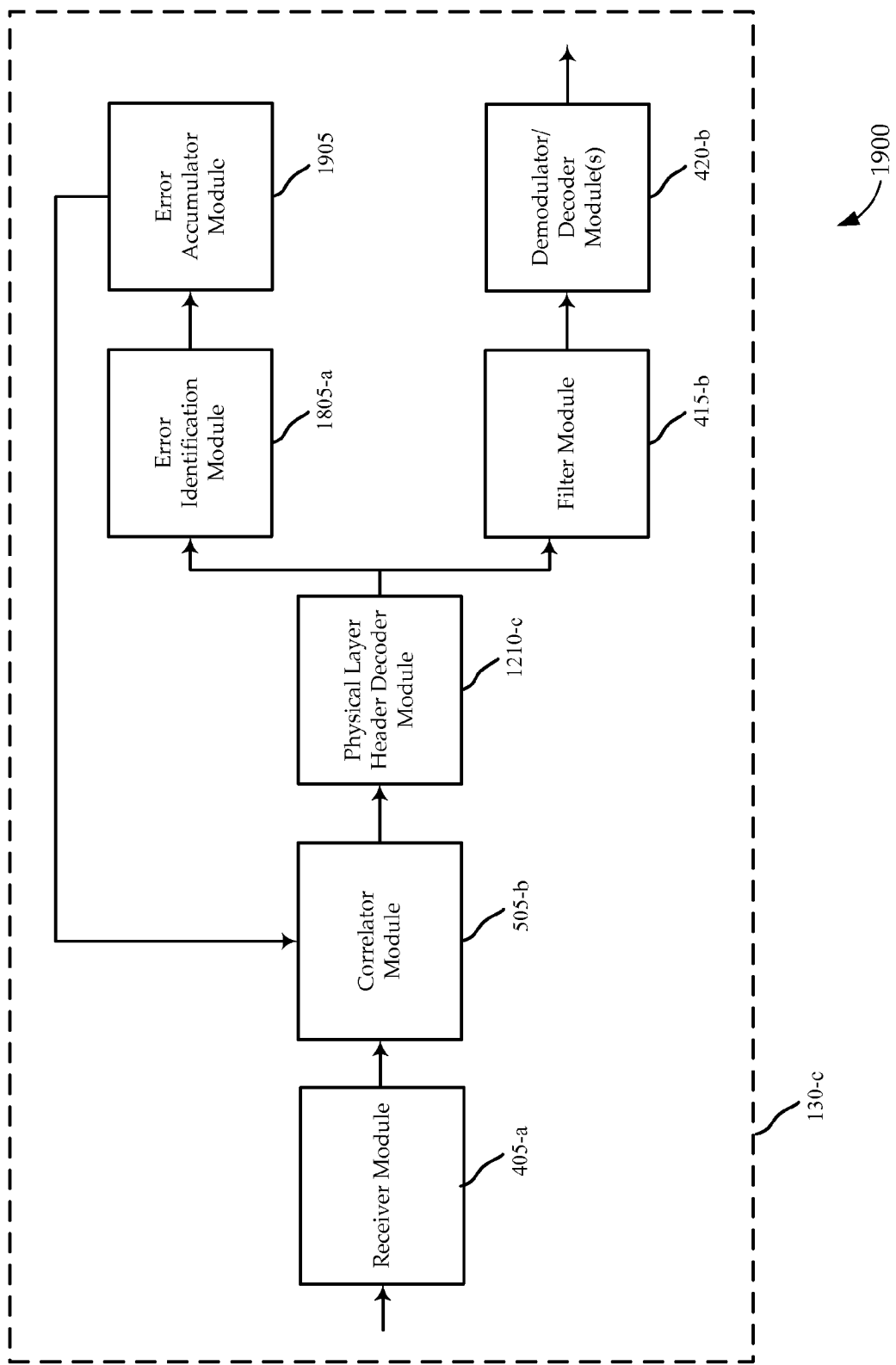
FIG. 19 is a block diagram of a user terminal for generating error values related to frame synchronization according to various embodiments of the invention.

Turning next to FIG. 19, a block diagram 1900 is shown illustrating an example of a terminal 130-c. This may, but need not be, the terminal 130 of FIG. 1 or 4. In this embodiment, the terminal 130-c includes a receiver module 405-a, a correlator module 505-b, a physical layer header decoder module 1210-c, an error identification module 1805-a, an error accumulator module 1905, a filter module 415-b, and demodulator/decoder module(s) 420-b. In the following example, physical layer frame 200-a of FIG. 2B will be used for purposes of example. The receiver module 405-a may be configured to receive a wireless signal transmitted via a satellite. This may, for example, be the signal transmitted from the gateway 115 through the satellite 105 as described with reference to FIG. 1, received via the user terminal antenna 130. The receiver module 405-a may downconvert and digitize the signal (e.g., using an integrated or separate A/D converter, not shown).

The correlator module 505-b may, therefore, receive a stream of physical layer frames 200, and search for the three Walsh code blocks at the start of each physical layer frame. The correlator module 505-b may thereby acquire frame synchronization. With frame synchronization achieved, the physical layer header of each frame 200 may be forwarded (or otherwise accessed by) the physical layer header decoder module 1210-c. As described above, the physical layer header decoder module 1210-c may perform a max correlation search to identify the most likely transmitted coded word set over the entire code block, thereby identifying the sub-channel identifier and modulation and coding information.

The error identification module 1805-a may search for the maximum bins over the F1, F2, and F3 results. The correlation value for each point may be calculated as $$C\text{sub}\_n[m] = fn\_i_m^2 + fn\_q_m^2 \text{ where } n=1, 2, 3 \text{ and } m=0, 1, \ldots, 31.$$

At the end of the search, the indices of the three maximums may be compared against the winning {j,k,l} triplet from the full header search (physical layer header decoder module 1210-c). As noted, if the three do not match, an error value may be stored in the error accumulator module 1905.

The error accumulator module 1905 may accumulate errors over a series of frames 200. More recently received frame errors may be weighted more heavily than errors from older frames. If the accumulated error value exceeds a threshold, a false synchronization lock may be assumed. The threshold may be a user configurable parameter. This may trigger the device 130-*c* to re-initialize frame synchronization at the correlator module 505-*b*.

In one embodiment, the error accumulator module 1905 may be a $1^{st}$ order infinite impulse response (IIR) filter. The false lock detection may be performed by having a fixed error value (fixed point equivalent of 1.0) input to the IIR filter when the three do match, or input zero into the filter otherwise. The filter equation may be as follows $$\text{filt\_out}[n] = (1-\alpha) * \text{filt\_out}[n-1] + (\alpha) * \text{filt\_in}[n]$$

where $\alpha$ is a user configurable gain parameter in the range (0.0, 1.0). If the filt_out value ever exceeds a user configurable threshold, false lock may be assumed and the physical layer frame synchronization mechanism is re-initialized.

It is worth noting that there are other ways the error value may be identified, and that false lock may be detected. As noted above, in one embodiment, instead of selecting either I for any error, and O otherwise, the error value may be more granular, and be moderated to reflect the degree of the error.

In addition to use for the false lock determination, the results from the physical layer header decoder module 1210-*c* may be forwarded for further processing. The filter module 415-*b* may forward (or filter) the physical layer payload associated with the respective physical layer header to the demodulator/decoder module(s) 420-*b* (e.g., based on the PSID included in the signaling information). The filter module 415-*b* and the demodulator/decoder module(s) 420-*b* need not be included in some embodiments. It is worth noting that this false lock detection may be performed with other code types, and in physical layer headers using more or fewer code blocks of the same or different lengths.

Figure 20:
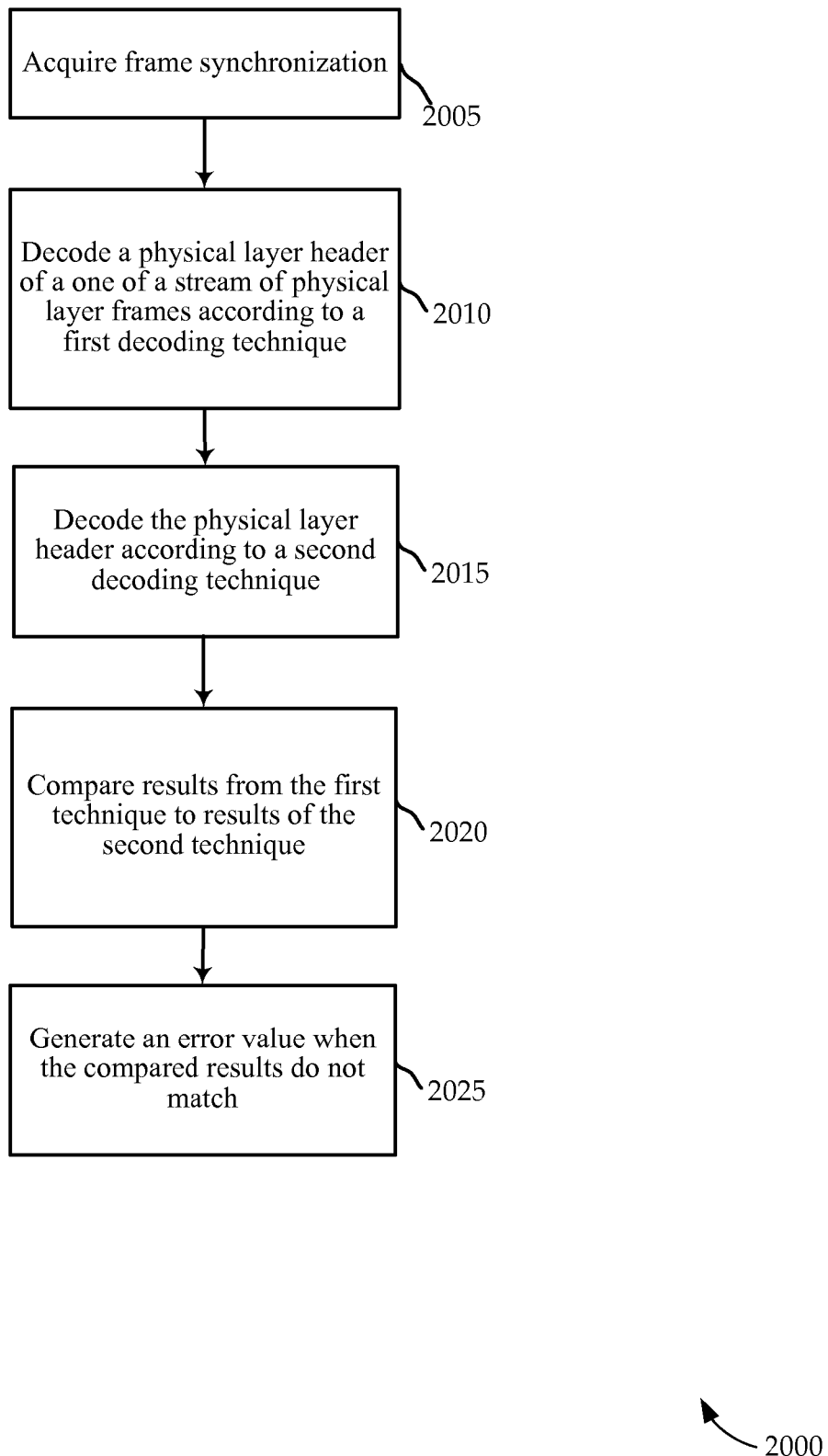
FIG. 20 is a flowchart illustrating a method for identifying error values related to frame synchronization according to various embodiments of the invention

Referring to FIG. 20, a flowchart is shown illustrating a method 2000 for identifying error values related to frame synchronization according to various embodiments of the invention. Aspects of method 2000 may be performed, for example, in whole or in part, by the terminal 130 described with reference to FIG. 1, 4, or 19 or, more specifically, with the physical layer header decoder module 1210 and error identification module 1805 of FIG. 18 or 19.

At block 2005, frame synchronization is acquired. At block 2010, a physical layer header of a one of a stream of physical layer frames is decoded according to a first decoding technique. At block 2015, the physical layer header is decoded according to a second decoding technique. At block 2020, results from the first technique are compared to results of the second technique. At block 2025, an error value is generated when the compared results do not match.

Figure 21:
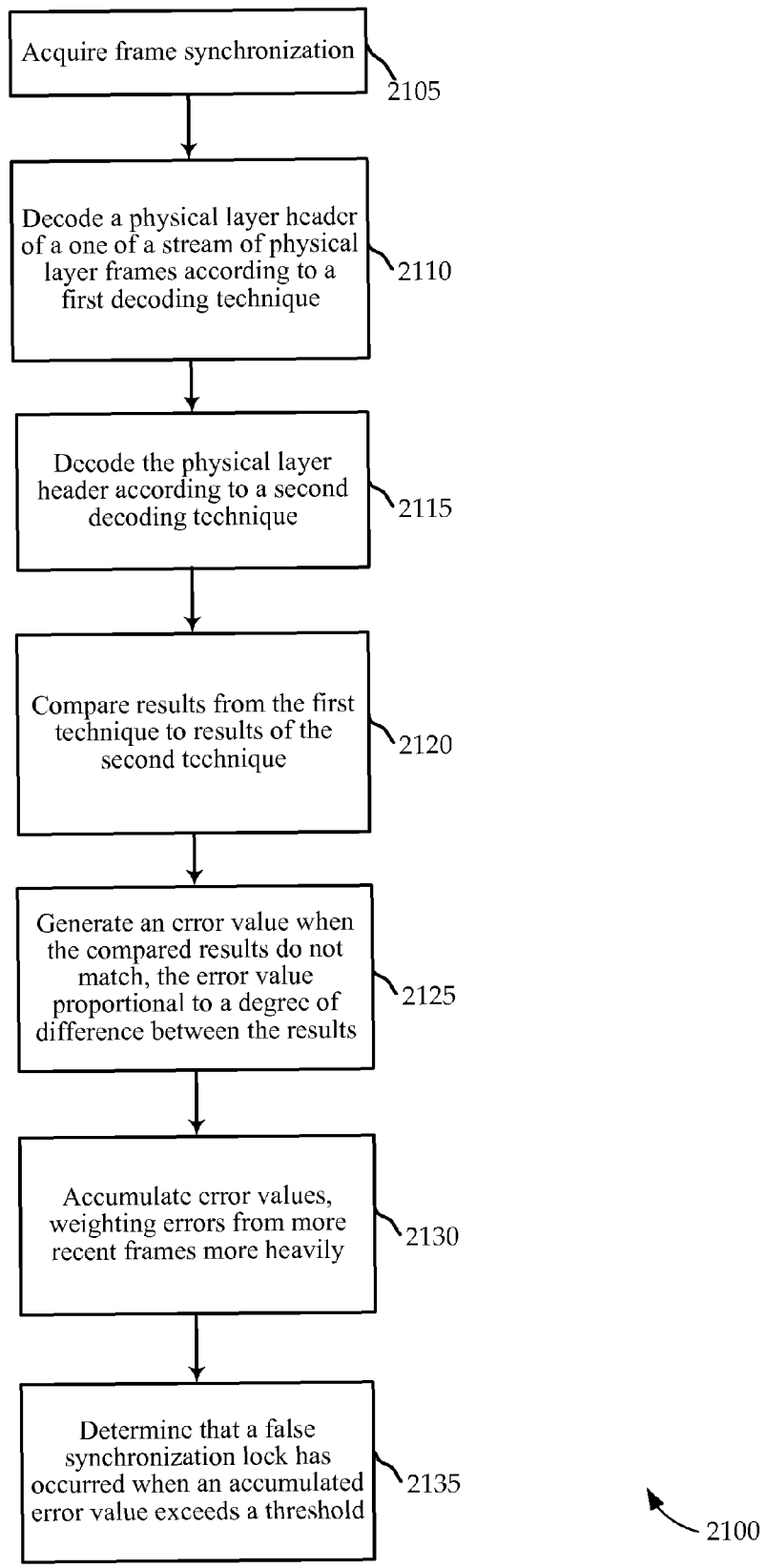
FIG. 21 is a flowchart illustrating a method for generating weighted error values related to frame synchronization according to various embodiments of the invention.

Referring to FIG. 21, a flowchart is shown illustrating a method 2100 for generating weighted errors values related to frame synchronization according to various embodiments of the invention. Aspects of the method 2100 may be performed, for example, in whole or in part, by the terminal 130 described with reference to FIG. 1, 4, or 19 or, more specifically, with the physical layer header decoder module 1210, error identification module 1805, and/or error accumulator module 1905 of FIG. 18 or 19.

At block 2105, frame synchronization is acquired. At block 2110, a physical layer header of a one of a stream of physical layer frames is decoded according to a first decoding technique. At block 2115, the physical layer header is decoded according to a second decoding technique. At block 2120, results from the first technique are compared to results of the second technique.

At block 2125, an error value is generated when the compared results do not match, the error value being proportional to a degree of difference between the results. At block 2130, error values are accumulated with errors from more recent frames weighting more heavily. At block 2135, a determination is made that false synchronization lock has occurred because an accumulated error value exceeds a threshold.

Figure 22:
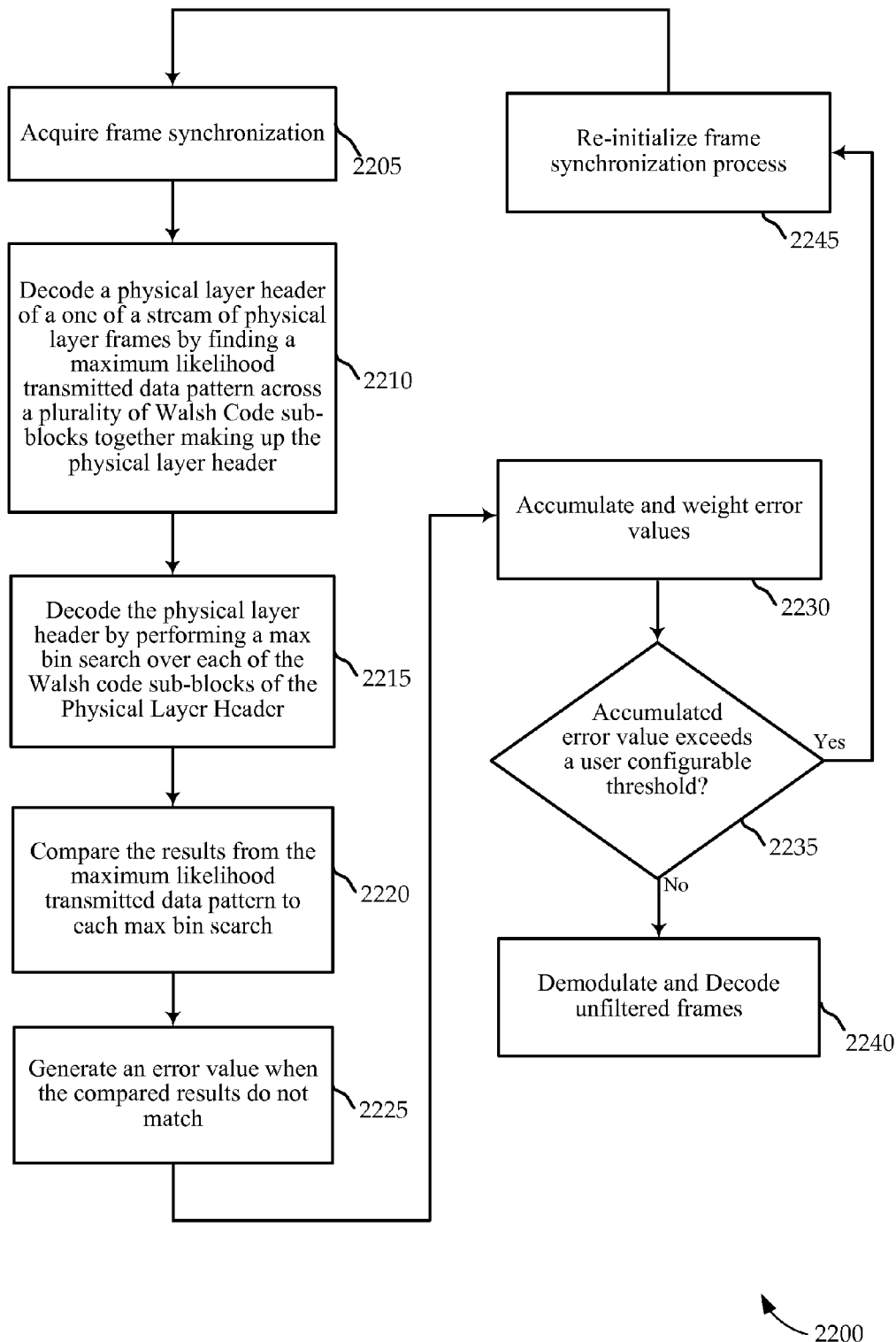
FIG. 22 is a flowchart illustrating a method for generating weighted error values related to frame synchronization according to various embodiments of the invention.

Referring to FIG. 22, a flowchart is shown illustrating a method 2200 for generating weighted errors values related to frame synchronization according to various embodiments of the invention. Aspects of the method 2200 may be performed, for example, in whole or in part, by the terminal 130 described with reference to FIG. 1, 4 or 19 or more specifically, with the physical layer header decoder module 1210, error identification module 1805, and/or error accumulator module 1905 of FIG. 18 or 19.

At block 2205, frame synchronization is acquired. At block 2210, a physical layer header of a one of a stream of physical layer frames is decoded by finding a maximum likelihood transmitted data pattern across a plurality of Walsh code sub-blocks which together make up the physical layer header. At block 2215, the physical layer header is decoded by performing a max bin search over each of the Walsh code sub-blocks of the physical layer header. At block 2220, the results from the maximum likelihood transmitted data pattern are compared to each max bin search. At block 2225, an error value is generated when the compared results do not match.

At block 2230, error values are accumulated and weighted. At block 2235, a determination is made whether the accumulated error value exceeds a user configurable threshold. If not, at block 2240, unfiltered frames are demodulated and decoded. If the accumulated error exceeds a threshold, at block 2245, the frame synchronization process is re-initialized.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory module" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A terminal to process a plurality of physical layer frames of a received wireless signal, the terminal comprising:
   a receiver module configured to receive a wireless signal comprising a plurality of physical layer frames;
   a physical layer frame synchronization module, communicatively coupled with the receiver module, and configured to identify one or more start of frame locations for the plurality of physical layer frames to achieve frame synchronization, wherein identifying a start of frame location is dependent only on a physical layer header associated with the start of frame location;
   a physical layer header decoder module, communicatively coupled with the physical layer frame synchronization module, and configured to decode a physical layer header associated with an identified start of frame location of a selected one of the plurality of physical layer frames according to a first decoding technique to identify signaling information attributable to a payload of the selected frame;
   an error identification module, communicatively coupled with the physical layer header decoder module, and configured to:
      decode the physical layer header according to a second decoding technique, wherein the physical layer header is divided into a plurality of sub-blocks and the second decoding technique decodes the sub-blocks of the physical layer header;
      compare results from the first decoding technique to results of the second decoding technique; and
      generate an error value associated with only the physical layer header and no other physical header when the compared results do not match; and
   an error accumulator module, communicatively coupled with the error identification module, and configured to:
      receive the generated error value;
      weight the generated error value in proportion to a degree of difference between the comparison of the results from the first decoding technique to results of the second decoding technique; and
      accumulate generated error values from one or more physical layer frames.

2. The terminal of claim 1, wherein the first decoding technique comprises finding a maximum likelihood transmitted data pattern across the plurality of sub-blocks of encoded data comprising the physical layer header.

3. The terminal of claim 2, wherein the plurality of sub-blocks comprise one or more sub-blocks of the signaling information and one or more sub-blocks of parity information.

4. The terminal of claim 2, wherein,
   the second decoding technique comprises performing a max bin search over each of the plurality of sub-blocks; and
   the error value is generated when each of the max bin searches does not match the maximum likelihood transmitted data pattern.

5. The terminal of claim 1, wherein the error accumulator module is further configured to:
   determine that a false synchronization lock has occurred when the accumulated error value exceeds a threshold.

6. The terminal of claim 5, wherein the threshold is a user configurable parameter.

7. The terminal of claim 1, wherein the error accumulator module is further configured to:
   weight a first set of error values from more recently received physical layer frames more heavily than a second set of error values from physical layer frames received before the more recently received physical layer frames.

8. The terminal of claim 1, wherein the error accumulator module comprises an infinite impulse response filter.

9. A device for processing a stream of physical layer frames, the device comprising:
   means for identifying one or more start of frame locations for a subset of the physical layer frames to achieve frame synchronization, wherein identifying a start of frame location is dependent only on a physical layer header associated with the start of frame location;
   means for decoding a physical layer header associated with an identified start of frame location according to a first decoding technique to identify signaling information attributable to a payload of the frame;
   means for decoding the physical layer header according to a second decoding technique, wherein the physical layer header is divided into a plurality of sub-blocks and the second decoding technique decodes the sub-blocks of the physical layer header;
   means for comparing results from the first decoding technique to results of the second decoding technique;
   means for generating an error value when the compared results do not match;
   means for weighing the generated error value in proportion to a degree of difference between the comparison of the results from the first decoding technique to results of the second decoding technique; and
   means for accumulating generated error values from one or more physical layer frames.

10. A method for processing a plurality of physical layer frames, the method comprising:
   acquiring frame synchronization for at least one physical layer frame of the plurality of physical layer frames, wherein acquiring frame synchronization for a physical layer frame is dependent only on a physical layer header associated with the physical layer frame;

decoding a code block of a physical layer header associated with a selected one of the at least one synchronized physical layer frame according to a first decoding technique to identify signaling information attributable to a payload of the selected frame;

decoding the code block of the physical layer header according to a second decoding technique, wherein the physical layer header is divided into a plurality of sub-blocks and the second decoding technique decodes the sub-blocks of the physical layer header;

comparing results from the first decoding technique to results of the second decoding technique;

generating an error value when the compared results do not match;

weighing the generated error value in proportion to a degree of difference between the comparison of the results from the first decoding technique to results of the second decoding technique;

accumulating generated error values from one or more physical layer frames; and determining that a false synchronization lock has occurred when an accumulated error value exceeds a threshold.

11. The method of claim 10, further comprising:
re-initializing frame synchronization in response to the determination that the false synchronization lock has occurred.

12. The method of claim 10, wherein the first decoding technique comprises:
finding a maximum likelihood transmitted data pattern across the plurality of sub-blocks of encoded data comprising the physical layer header.

13. The method of claim 12, wherein each of the physical layer header comprises two Walsh code sub-blocks of the signaling information and one Walsh code sub-block of parity information.

14. The method of claim 12, further comprising:
utilizing the physical layer header to identify a start of frame.

15. The method of claim 12, wherein the second decoding technique comprises:
performing a max bin search over each of the plurality of sub-blocks, wherein the error value is generated when each of the max bin searches does not match the maximum likelihood transmitted data pattern.

16. The method of claim 10, further comprising:
weighting error values from more recently received physical layer frames more heavily than error values from older physical layer frames.

17. The method of claim 10, wherein the threshold is a user configurable parameter.

18. A system for transmitting a wireless signal, the system comprising:
a gateway configured to:
generate a code block comprising a physical layer header of a selected physical layer frame, the code block identifying signaling information for a payload of the selected frame and further formatted to be useable by a receiver to identify a start of the frame; and
transmit a plurality of physical layer frames in a wireless signal, including the selected physical layer frame; and
a terminal, in communication with the gateway via a satellite, and configured to:
receive the wireless signal;
synchronize at least a physical layer frame, wherein synchronizing the physical layer frame is dependent only on a physical layer header associated with the physical layer frame;
decode the physical layer header according to a first decoding technique to identify signaling information attributable to a payload of the selected frame;
decode the physical layer header according to a second decoding technique, wherein the physical layer header is divided into a plurality of sub-blocks and the second decoding technique decodes the sub-blocks of the physical layer header;
compare results from the first decoding technique to results of the second decoding technique;
generate an error value associated with only the physical layer header and no other physical header when the compared results do not match;
weight the generated error value in proportion to a degree of difference between the comparison of the results from the first decoding technique to results of the second decoding technique; and
accumulate generated error values from one or more physical layer frames.

* * * * *